United States Patent
Cui et al.

(10) Patent No.: US 12,360,270 B1
(45) Date of Patent: Jul. 15, 2025

(54) SEDIMENT CLASSIFICATION METHOD AND SYSTEM BASED ON BOTTOM ECHO INFORMATION OF DEEP-SEA MULTIBEAM WATER COLUMN

(71) Applicant: SHANDONG UNIVERSITY OF SCIENCE AND TECHNOLOGY, Shandong (CN)

(72) Inventors: Xiaodong Cui, Shandong (CN); Feihu Zhang, Shandong (CN); Fanlin Yang, Shandong (CN); Xianhai Bu, Shandong (CN); Tianyu Yun, Shandong (CN); Feng Wang, Shandong (CN); Wenjun Li, Shandong (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/942,289

(22) Filed: Nov. 8, 2024

(30) Foreign Application Priority Data

Jun. 4, 2024 (CN) .......................... 202410712010.1

(51) Int. Cl.
*G01V 1/28* (2006.01)
*G01V 1/38* (2006.01)

(52) U.S. Cl.
CPC .............. *G01V 1/282* (2013.01); *G01V 1/38* (2013.01); *G01V 2210/661* (2013.01)

(58) Field of Classification Search
CPC ..... G01V 1/282; G01V 1/38; G01V 2210/661
See application file for complete search history.

(56) References Cited

U.S. PATENT DOCUMENTS

| | | | |
|---|---|---|---|
| 7,760,586 B2 * | 7/2010 | Komatsu | G01S 15/88 367/21 |
| 8,520,210 B2 * | 8/2013 | Ramme | C04B 18/082 209/133 |
| 11,500,125 B2 * | 11/2022 | Zukerman | G01V 20/00 |

FOREIGN PATENT DOCUMENTS

| | | |
|---|---|---|
| CN | 115422981 A | 12/2022 |
| CN | 115730247 A | 3/2023 |
| CN | 116452963 A | 7/2023 |
| CN | 117914390 A | 4/2024 |
| CN | 117953314 A | 4/2024 |

* cited by examiner

*Primary Examiner* — Elias Desta

(57) ABSTRACT

Disclosed is a sediment classification method and system based on bottom echo information of a deep-sea multibeam water column, falling within the technical field of seabed sediment classification. Multidimensional features of seabed multibeam time series are extracted by using multibeam water column data, and multidimensional features of seabed spots are constructed by fusing an angle response curve; double-waveform spectrum comparison of original sample point waveform with seabed measured point waveform is performed, and two groups of corresponding waveforms are matched by using Cosine Similarity to expand original sample points; and the reliability of classification results is improved. In the present disclosure, the transformation from hard to soft classification is realized, and the seabed habitat inversion of complex mixed sediment in a deep sea is further realized.

8 Claims, 19 Drawing Sheets

SEDIMENT CLASSIFICATION METHOD AND SYSTEM BASED ON BOTTOM ECHO INFORMATION OF DEEP-SEA MULTIBEAM WATER COLUMN

CROSS-REFERENCE TO RELATED APPLICATION

This application claims priority of Chinese Patent Application No. 202410712010.1, filed on Jun. 4, 2024, the entire contents of which are incorporated herein by reference.

TECHNICAL FIELD

The present disclosure belongs to the technical field of seabed sediment classification, and in particular relates to a sediment classification method and system based on bottom echo information of a deep-sea multibeam water column.

BACKGROUND

With the development of underwater detection technology, a multibeam echo-sounding system (MBES) has become the mainstream method for evaluating seabed roughness, sediment types, and benthic habitats due to its advantages of full coverage, high accuracy and high efficiency. In the near-shallow sea scenario, a seabed sediment classification system has been established, which takes the backscattering intensity data and echo-sounding data collected by MBES as the main ones, supplemented by the underwater in-situ sampling technology, to obtain corresponding features and construct a classification model, thereby obtaining a high-accuracy seabed sediment classification map. However, in the large-scale water depth and complex water column environment of a deep-sea, the sediment mixing phenomena caused by factors such as low utilization rate of multibeam data, high feature dependence, and few field sampling samples generally still restricts the accurate cognition and interpretation of large-scale seabed (including surface sediments and benthic habitats). In view of the above problems, in the prior art, the multi-angle observation information contained in the multibeam angle response data is fully mined, and on the basis of analyzing the universality of the mixed sediment in the deep-sea environment at the current multibeam observation resolution, spatial spectrum information is taken as an entry point to fully mine the multi-angle observation information embodied in the multibeam backscattering intensity angle response data. On this basis, combined with unsupervised clustering and mixed pixel decomposition technology, the sub-pixel decomposition of deep-sea mixed sediment components is carried out to extract and analyze the mixing degree and distribution state of seabed sediment in complex deep-sea environments. Two aspects of research are mainly included, namely, pre-classification process and mixed sediment decomposition process. Firstly, the sliding window is used as a traversal unit, and intensity statistical features are extracted by bidirectional sliding. Secondly, a feature vector composed of the intensity statistical features is inputted into a K-means classifier for homogeneous region clustering (i.e., pre-classification). Thirdly, a nonlinear mixed sediment decomposition model based on a fuzzy method is proposed to extract the abundance of three sediment types in a study area (sandy, silty and clay), taking multibeam deepwater survey data and field sampling data in the central Philippine sea as examples. Finally, the obtained sediment abundance inversion results are verified and discussed.

For the third type of data acquired by the MBES: "water column data", contains all the intensity time series information emitted from the transducer to the seabed. The internal structure and physical properties of seabed sediments are closely related to the acoustic properties such as acoustic attenuation and acoustic waves scattering of the sediment layer, and different seabed sediments and acoustic frequencies show different echo waveform features. Therefore, the intensity spectrum signals recorded in the time series from the arrival of the beam at the seabed to the penetration of a certain depth are directly related to the properties of the sediment, and the analysis of the time series waveform of a single beam can be used for the classification of the seabed sediment in the deep sea.

Through the above analysis, the problems and defects existing in the prior art are as follows: in the prior art, the multibeam seabed sediment classification method relies on the traditional underwater in-situ sampling technology, but it has some shortcomings such as heavy machinery, time-consuming, labor-consuming and difficult sampling in a deep water area, which makes the gap between the acquisition of multibeam detection data and the acquisition of seabed sampling information gradually widen in data volume and acquisition efficiency. Firstly, due to the limitation of seabed sediment sampling methods, the scarcity of sediment sampling has become a key problem hindering the further development of sediment classification. Secondly, the application of multibeam backscattering intensity features or seabed topographic features is limited to a thin layer of the surface of the seabed, which cannot characterize the echo features of acoustic wave penetrating the seabed, and to some extent, limits the characterization ability of acoustic information in a certain depth range of seabed media. Finally, the current classification of seabed surface sediment based on acoustic means basically follows the traditional hard classification method, that is, each observation unit (or pixel point) is only associated with one pure sediment category. However, under the condition of deepwater multibeam at low resolution, the seabed sediment classification method based on pure pixels makes it difficult to accurately characterize the mixing of sediment categories and intermediate states in the observation unit.

SUMMARY

In order to overcome the problems existing in the related art, a disclosed embodiment of the present disclosure provides a sediment classification method and system based on bottom echo information of a deep-sea multibeam water column.

The technical solutions are provided as follows. A sediment classification method based on bottom echo information of a deep-sea multibeam water column includes the following steps:

S1, extraction of multidimensional features: extracting multidimensional features of seabed multibeam time series by using multibeam water column data, and constructing multidimensional features of seabed beam spots by fusing an angle response curve, S2, sample expansion and screening: performing double-waveform spectrum comparison of original sample point waveforms with seabed measured point waveforms, and matching two groups of corresponding waveforms by using a cosine similarity function, so as to expand original sample points, and performing secondary filtration on expanded waveforms by using unsupervised classification results, S3, analysis of mixed pixel membership: constructing a classification category abundance map, and completing seabed habitat inversion of complex mixed sediment in a deep sea, and S4, decision fusion based on supervised classification and unsupervised classification: predicting and classifying discrete point clouds by using a random forest model, creating a multi-classification decision fusion mechanism, and performing category decision on a prediction result of the random forest model and an unsupervised classification prediction result.

In step S1, the extraction of multidimensional features includes the steps of:

S101, extraction of bottom echo: selecting a plurality of waveform sequences downward from a sequence number of each beam reaching a seabed point;

S102, extraction of bottom echo features: extracting an original intensity, maximum value, minimum value, total value, mean value, peak-to-peak value, standard deviation, root-mean-square value, half-wave peak width, peak factor, kurtosis, skewness, and margin factor features from the bottom echo as classification basic data;

S103, extraction of angle response features: using ping as a basic unit for the angle response curve, and extracting mean value, slope, skewness and kurtosis features; and S104, feature fusion: performing parallel merger on the bottom echo features and angle response features to construct a multidimensional feature vector.

In step S102, a calculation formula of kurtosis is:

$$\text{Kutosis} = \frac{1}{n-1} \sum_{i=1}^{n} \frac{(x_i - \bar{x})^4}{SD^4} - 3$$

where, Kutosis is a kurtosis coefficient, n is a serial number of each sampling point in one ping in multibeam data, xi is an intensity value of each beam, x is a mean value of one ping, and SD is a standard deviation of one ping intensity; and a calculation formula of skewness is:

$$\text{Skewness} = \frac{1}{n-1} \sum_{i=1}^{n} \frac{(x_i - \bar{x})^3}{SD^3}$$

where, Skewness is a skewness coefficient.

In step S2, the sample expansion and screening includes the steps of:

S201, expansion based on the cosine similarity function: expanding the original sample points, which are extremely few in number, by using the cosine similarity function, and S202, traversal screening of multivariate classification results: comparing expanded samples one by one through clustering results of unsupervised classification K-means, and eliminating expansion points with low reliability to realize the screening of the expanded samples.

In step S201, a calculation formula of the cosine similarity function is as follows:

$$\text{cosine\_similarity} = \frac{\sum_{i=1}^{n} a_i \cdot b_i}{\sqrt{\sum_{i=1}^{n} a_i^2} \cdot \sqrt{\sum_{i=1}^{n} b_i^2}}$$

where, $a_i$ and $b_i$ are two vectors whose similarity needs to be solved, the sample point waveform and seabed point waveform are regarded as two vectors, and a cosine value of an included angle between the two vectors is calculated in a vector space; and the smaller the included angle, the closer the cosine value is to 1, and the higher the similarity.

In step S3, the analysis of mixed pixel membership includes the steps of:

S301, gridding of point cloud data: taking fifty percent of sample points expanded and screened by the cosine similarity function as training samples, and the remaining fifty percent as verification samples for supervised classification, and processing, after obtaining supervised classification results and the unsupervised classification results of the point clouds, the supervised classification results and the unsupervised classification results by using large grids, and S302, calculation of category abundance: calculating each category abundance in the grid by utilizing a concept of species abundance in ecology, forming an abundance image of each category for visualization, and performing single category normalization processing on category abundance values in the grid to form an abundance image of each category abundance.

In step S4, the decision fusion based on supervised classification and unsupervised classification includes the steps of:

S401, comparing the supervised classification results with the unsupervised classification results one by one, if a supervised classification result and an unsupervised classification result indicate a same category, taking the same category as a result category, and an expression being as follows:

$$O[i] = C_n[i] = C_m[i]$$

where, $C_n[i]$ is a category of an i-th beam spot in the supervised classification result by random forest, $C_m[i]$ is a category of an i-th beam spot in K-means clustering classification results, and $O[i]$ is the result category through discrimination, S402, if the supervised classification result and the unsupervised classification result indicate different categories, calculating categories of maximum abundances in certain large grids where two beam spots corresponding to the supervised classification result and the unsupervised classification result are located, and abundance values corresponding to the categories of the maximum abundances, $$V_m > V_n$$

$$\max C_n = C_n[i]$$

$$\max C_m = C_m[i]$$

where, $\max C_m$ is a category of maximum abundance in a K-means abundance grid where the i-th beam spot in K-means clustering classification results is located, $\max C_n$ is a category of a maximum abundance in a forest model abundance grid, where the i-th beam spot in the supervised classification results by the random forest model is located, of the random forest model, $V_m$ is an abundance value corresponding to $\max C_m$, and $V_n$ is an abundance value corresponding to $\max C_n$, S403, determining whether the categories of the maximum abundances indicate a same category, and if so, determining that the same category is the result category, S404, if the categories of the maximum abundances indicate different categories, comparing the maximum abundance in the K-means abundance grid and the maximum abundance in the forest model abundance grid to determine whether a category corresponding to a larger abundance of the maximum abundance in the K-means abundance grid and the maximum abundance in the forest model abundance grid exists in the supervised classification results and the unsupervised classification results, and if so, taking the category corresponding to the larger abundance as the result category, S405, if the category corresponding to the larger abundance does not exist in the supervised classification results and the unsupervised classification results, acquiring abundance values corresponding to the supervised classification result and the unsupervised classification result, and taking a larger one as the result category, $$C_{m\_}\text{Value} \geq C_{n\_}\text{Value}$$

where, $C_{m\_}$Value is an abundance value of $C_m[i]$, and $C_{n\_}$Value is an abundance value of $C_n[i]$, and S406, performing discrimination of steps S401 to S405 on each waveform point to finally discriminate entire data, and outputting a final classification result.

Another object of the present disclosure is to provide a sediment classification system based on bottom echo information of a deep-sea multibeam water column, implementing the sediment classification method based on bottom echo information of a deep-sea multibeam water column, including:

a multidimensional feature extraction module based on combination of multibeam time series bottom echo with the angle response curve, configured to extract the multidimensional features of the seabed multibeam time series by using the multibeam water column data, and construct the multidimensional features of seabed spots by fusing the fusion angle response curve;

a sample expansion and screening module, configured to perform the double-waveform spectrum comparison of the original sample point waveform with the seabed measured point waveform, match the two groups of corresponding waveforms by using the cosine similarity function, and expand the original sample points;

a decision fusion module based on supervised classification and unsupervised classification, configured to predict and classify the discrete point clouds by using the random forest model, create the multi-classification decision fusion mechanism, and perform category decision on the prediction result and the prediction result of unsupervised classification in a sliding window; and a mixed pixel membership analysis module, configured to construct the classification category abundance map, and complete the seabed habitat inversion of the complex mixed sediment in the deep sea.

Further, the system can be applied to evaluate seabed roughness, sediment types, and benthic habitats in large-scale deep-sea water depth and complex water column environment.

Further, the system is loaded on a computer-readable storage medium storing a computer program that, when executed by a processor, realizes functions of a sediment classification system based on bottom echo information of a deep-sea multibeam water column.

Combining all the technical solutions mentioned above, the present disclosure has the following beneficial effects. In the present disclosure, firstly, the multidimensional features of the seabed multibeam time series are extracted by using the multibeam water column data, and the multidimensional features of seabed spots are constructed by fusing the angle response curve; secondly, the double-waveform spectrum comparison of the original sample point waveform with the seabed measured point waveform is performed, and the two groups of corresponding waveforms are matched by using Cosine Similarity to expand the original sample points; thirdly, the discrete point clouds are predicted and classified by using the random forest model, the multi-classification decision fusion mechanism is created, and category decision is performed on the prediction result and the prediction result of unsupervised classification in a sliding window, improving the reliability of classification results; and finally, the classification category abundance map is constructed, realizing the transformation from hard to soft classification, and further realizing the seabed habitat inversion of complex mixed sediment in a deep sea.

In the present disclosure, the problems of training data set expansion and optimization screening under the condition of small deep-sea samples are solved; the commonly used hard classification method of grid as a unit is got rid of, and the point clouds are directly classified, which is more suitable for low-resolution data sets; and the quantitative decomposition of mixed sediment components in a deep-sea low-resolution environment is broken through. Combining the classification results of supervised classification and unsupervised classification, a mixed pixel membership decision scheme based on point clouds is proposed, improving the reliability of classification results. The present disclosure can effectively contribute to the problem of sediment interpretation in deep-sea environment, and provides important guiding significance for future commercial deep-sea sediment exploration or scientific research sediment interpretation.

BRIEF DESCRIPTION OF THE DRAWINGS

The accompanying drawings herein, which are incorporated into and constitute a part of the specification, illustrate embodiments consistent with the present disclosure and, together with the specification, serve to explain the principles of the present disclosure.

DETAILED DESCRIPTION

To make the above objects, features and advantages of the present disclosure more apparent, a detailed description of specific implementations of the present disclosure will be given below with reference to the accompanying drawings. Numerous specific details are set forth in the following description to facilitate the full understanding of the present disclosure. However, the present disclosure can be practiced in many other ways other than those described herein, and similar modifications can be made by those skilled in the art without departing from the spirit of the present disclosure, and therefore, the present disclosure is not limited by the specific embodiments disclosed below.

The innovative point of the present disclosure is that the present disclosure realizes the extraction of multidimensional features of multibeam time series and combines the multibeam angle response curve features to carry out the seabed habitat sediment inversion in the deep-sea environment. Due to the influence of deep-sea environment and the scarcity of sample points, a dual-waveform spectrum comparison method based on the original sample point waveform and the seabed measured point waveform is developed. Two groups of corresponding waveforms are matched by using a cosine similarity function, original sample points are expanded, and secondary screening is performed on the expanded sample points combined with the prediction results of unsupervised classification. The discrete point clouds are predicted and classified by using the random forest model, the multi-classification decision fusion mechanism is created, and the category decision is performed on the prediction result and the prediction result of unsupervised classification in a sliding window, greatly improving the reliability of classification results. The classification category abundance map is constructed, realizing the transformation from hard to soft classification, and further realizing the seabed habitat inversion of complex mixed sediment in a deep sea.

In the present disclosure, feature extraction is performed based on the seabed point waveform, and sediment classification is performed in combination with the angle response curve features. The point cloud is used as a unit for sediment classification, and a visual abundance map of classification results is formed by combining the concept of abundance. Combining the classification results of supervised classification and unsupervised classification and incorporating the abundance of mixed pixels, the final membership analysis of the two classification results is made, and the classification results are optimized.

Figure 1:
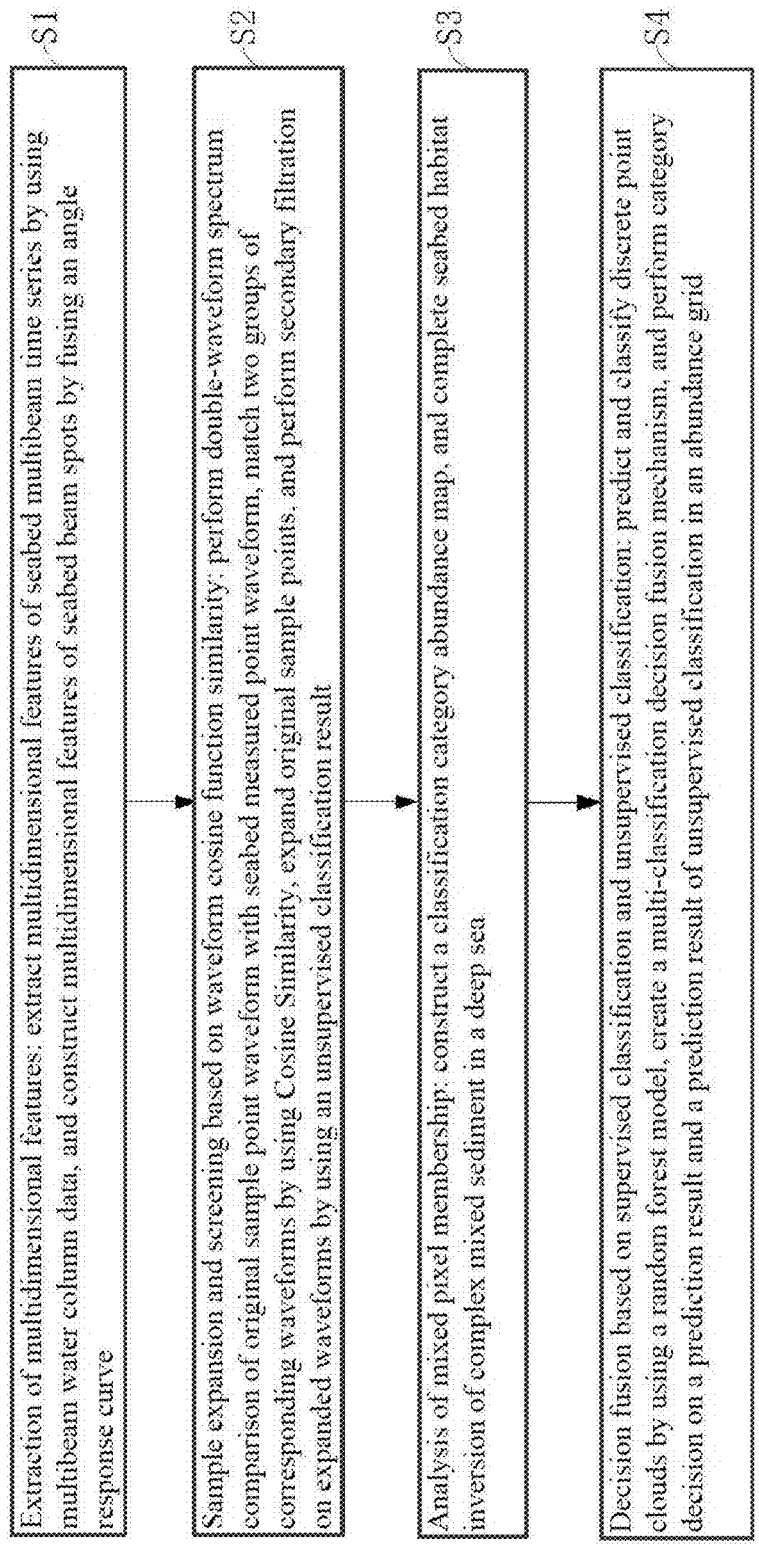
FIG. 1 is a flow chart of a sediment classification method based on bottom echo information of a deep-sea multibeam water column provided by an embodiment of the present disclosure.

As shown in FIG. 1, a sediment classification method based on bottom echo information of a deep-sea multibeam water column provided by an embodiment of the present disclosure includes the following steps.

In S1, extraction of multidimensional features: multidimensional features of seabed multibeam time series are extracted by using multibeam water column data, and multidimensional features of seabed beam spots are constructed by fusing an angle response curve.

Figure 2:
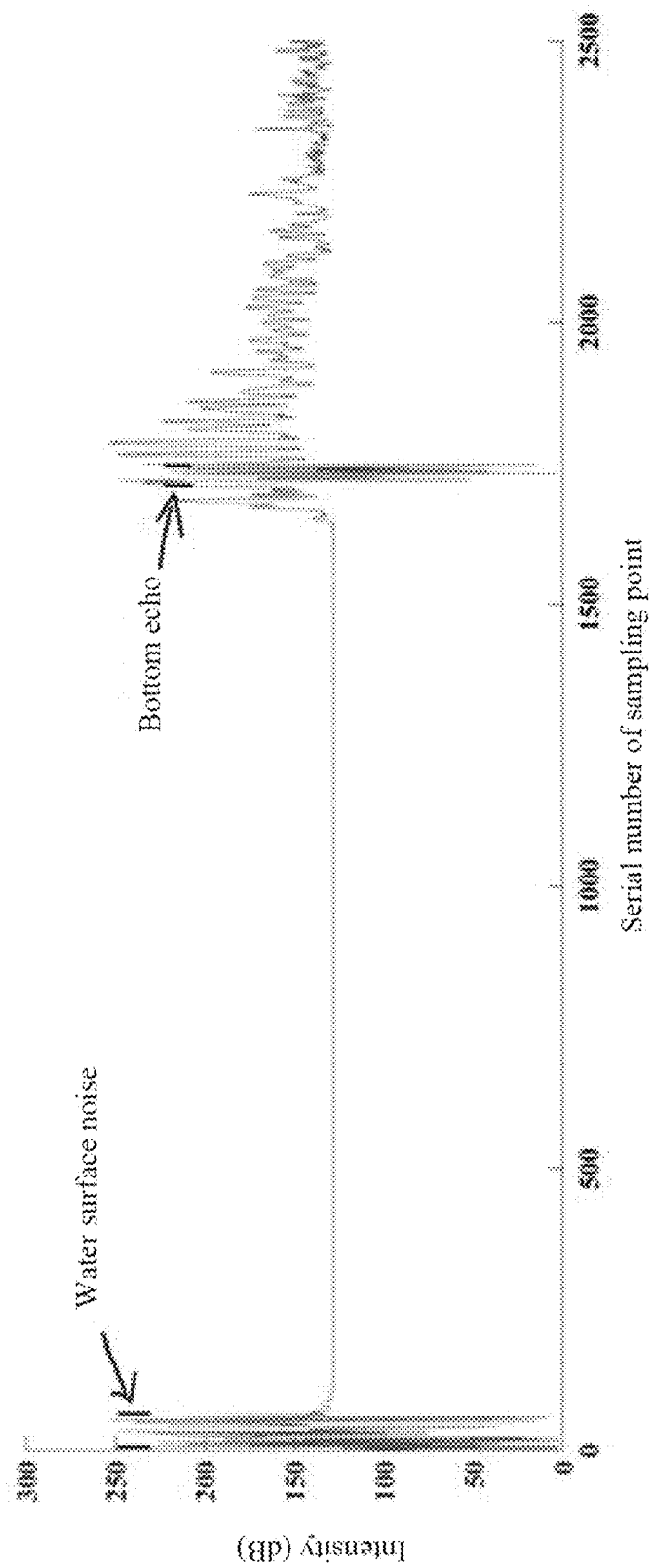
FIG. 2 is a line chart of reflection intensity of a certain beam provided by an embodiment of the present disclosure.
Figure 3:
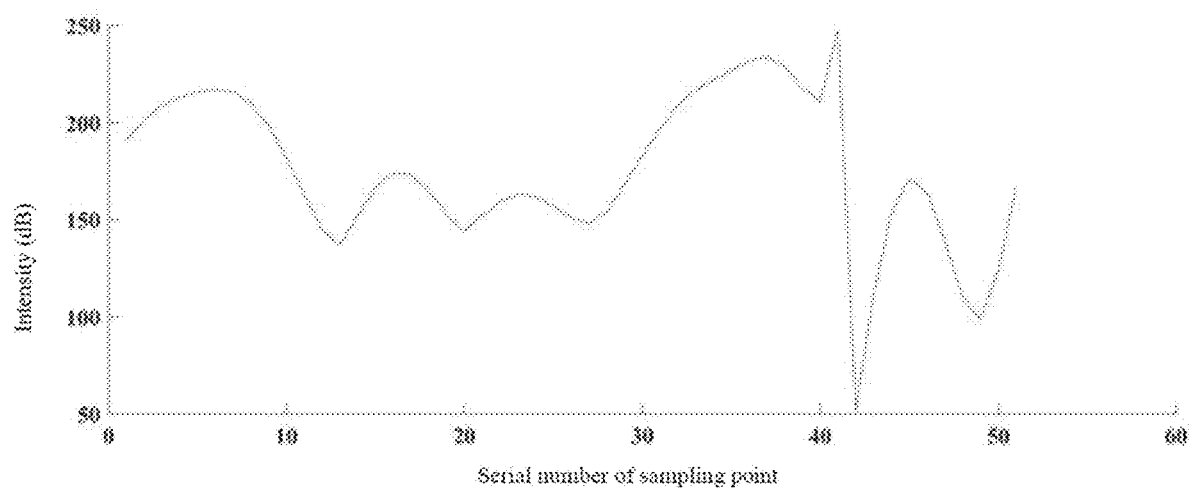
FIG. 3 is a bottom echo diagram provided by an embodiment of the present disclosure.

Multibeam water column data is the most original data obtained by a multibeam system, which records all the backscattering intensity information of the whole process of acoustic waves from transmission to reception and constitutes a complete intensity time series. After the acoustic wave propagates through the water column and reaches the bottom, it can still penetrate the seabed at a certain depth. This part of the time series data records the changes of acoustic wave intensity on the seabed. There are certain differences in the changes of acoustic intensity waveforms under different seabed sediment types, and the seabed sediment can be effectively divided according to this difference. FIG. 2 is a line chart of the backscattering intensity of a certain beam in water column data. It is not difficult to see in FIG. 2 that the backscattering intensity of the water column data is mainly divided into three parts: a noise area close to a water surface in an initial stage, and a relatively gentle area (a seawater water column) in a medium stage, and a final seabed reflection area. Specifically, the following steps are included:

In S101, extraction of bottom echo: the extraction of bottom echo features is to select 50 waveform sequences downward from the serial number of each beam reaching the seabed point, as shown in FIG. 3, which is a bottom echo diagram.

In S102, extraction of bottom echo features: 13 features including original intensity, maximum value, minimum value, total value, mean value, peak-to-peak value, standard deviation, root-mean-square value, half-wave peak width, peak factor, kurtosis, skewness, and margin factor are extracted from the bottom echo as classification basic data.

In S103, extraction of angle response features: for the angle response curve, ping is used as a basic unit, and 4 features including mean value, slope, skewness and kurtosis are extracted. Specifically, the following is included:

Assuming that the multibeam backscattering data of one ping has 300 beams, a mean value of intensities of these 300 beams is a mean value of this ping. A set of slopes is obtained by dividing the difference between the intensity of a previous beam and the intensity of a next beam by a corresponding beam angle, and a mean slope of this ping is obtained by averaging 299 slopes. The formulas of kurtosis and skewness are as follows:

A calculation formula of kurtosis is:

$$\text{Kutosis} = \frac{1}{n-1}\sum_{i=1}^{n}\frac{(x_i - \bar{x})^4}{SD^4} - 3$$

where, Kutosis is a kurtosis coefficient, n is a serial number of each sampling point in one ping in multibeam data, xi is an intensity value of each beam, x is a mean value of one ping, and SD is a standard deviation of one ping intensity; and a calculation formula of skewness is:

$$\text{Skewness} = \frac{1}{n-1} \sum_{i=1}^{n} \frac{(x_i - \bar{x})^3}{SD^3}$$

where, Skewness is a skewness coefficient.

Kutosis is also known as a kurtosis coefficient, which is a feature number that represents a peak value of a probability density distribution curve at an average value. Intuitively, kurtosis reflects the sharpness of a peak. The kurtosis of a sample is a statistic compared to a normal distribution. If the kurtosis is greater than three, the shape of the peak is sharp and steeper than that of the normal distribution peak; and vice versa. Skewness is a skewness coefficient, which is a measure of the direction and degree of skew in the distribution of statistical data. It is a statistic used for describing the degree of asymmetry in the probability distribution or data set. It describes on which side of the average value a tail of the data distribution is heavier or longer, helping to understand the skewed nature of the data, i.e., the distribution of data relative to the average value.

In S104, feature fusion: parallel merger is performed on the bottom echo features and angle response features to construct a 17-mensional feature vector. Specifically, the following is included:

After feature generation, each column is listed as a feature. During merging, the feature columns are superimposed backwards. For example, the bottom echo feature is 13 dimensions (13 columns), and the angle response curve feature is 4 dimensions (4 columns). A feature after feature fusion is 17 dimensions (17 columns).

In S2, sample expansion and screening: double-waveform spectrum comparison is performed on original sample point waveforms with seabed measured point waveforms, and two groups of corresponding waveforms are matched by using a cosine similarity function, such that original sample points are expanded, and secondary filtration is performed on expanded waveforms by using unsupervised classification results.

Figure 4:
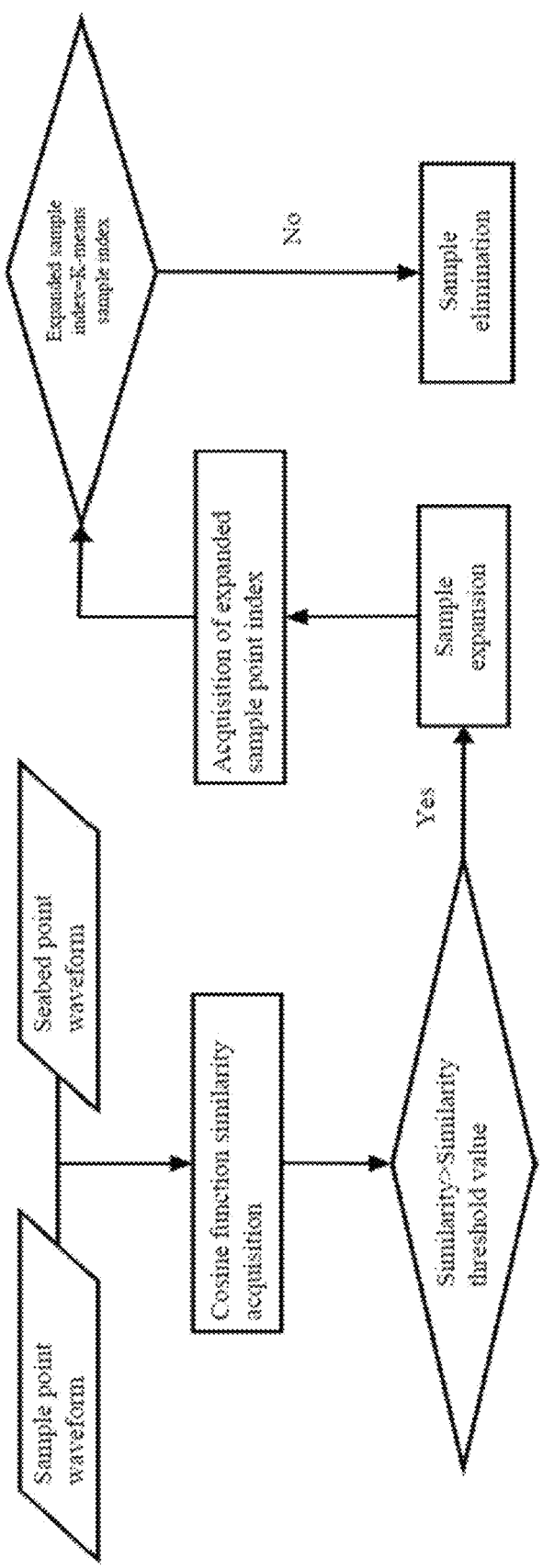
FIG. 4 is a flow chart of sample expansion provided by an embodiment of the present disclosure.

Due to the particularity of deep-sea environment, sampling is difficult and the cost of sampling is too high. In the present disclosure, the principle of waveform similarity is innovatively utilized to optimize and expand a small number of original sample points and secondary screening is performed on the expanded samples in combination with the supervised classification result, so that the number of samples meets the training requirements of supervised classification. FIG. 4 shows the overall flow of the module. A calculation formula of the cosine similarity function in the waveform similarity principle is as follows:

$$\text{cosine\_similarity} = \frac{\sum_{i=1}^{n} a_i \cdot b_i}{\sqrt{\sum_{i=1}^{n} a_i^2} \cdot \sqrt{\sum_{i=1}^{n} b_i^2}}$$

where, $a_i$ and $b_i$ are two vectors whose similarity needs to be solved. Specifically, the sample point waveform and seabed point waveform are regarded as two vectors, and a cosine value of an included angle between the two vectors is calculated in a vector space; and the smaller the included angle, the closer the cosine value is to 1, and the higher the similarity.

The calculation formula of the cosine similarity function is to evaluate the similarity of two vectors by calculating the cosine of the included angle between the two vectors. Specifically, the sample point waveform and the seabed point waveform are regarded as two vectors, and a cosine value of an included angle between the two vectors is calculated in a vector space. The smaller the included angle, the closer the cosine value is to 1, the more consistent the directions, and the higher the similarity. In this way, the trend similarity of two waveforms is determined, and the waveform is expanded. Specifically, the following is included:

In S201, expansion based on the cosine similarity function: this method mainly uses the cosine similarity function to expand the original sample points which are extremely few in number. Because the cosine similarity function measures the similarity of two vectors by calculating the cosine value of the included angles between the two vectors, the cosine similarity function is not sensitive to the numerical value, but more sensitive to the directionality, which can well deal with the problem of waveform pre-position or post-position in the bottom echo similarity evaluation, greatly improving the reliability of expansion based on waveform similarity.

In S202, traversal screening of multivariate classification results: expanded samples are compared one by one through clustering results of unsupervised classification K-means, and some expansion points with low reliability are eliminated to realize the accurate screening of the expanded samples.

Specifically, the following is included: firstly, the bottom echoes are screened one by one with threshold values through the cosine similarity function, and category comparison is performed on the screened sample points with the results of unsupervised classification. If there are similarities, the sample points are adopted; otherwise, the sample points are discarded.

In S3, analysis of mixed pixel membership: a classification category abundance map is constructed, and seabed habitat inversion of complex mixed sediment in a deep sea is completed.

In deep-sea environment, an MBES can achieve full-coverage acquisition of seabed information, but it is difficult to meet the high resolution of data. Therefore, the traditional classification in the form of pure pixels is not applicable, and the problem of mixed pixels has become a difficult problem to solve by conventional sediment classification methods, which greatly affects the accuracy of deep-sea sediment representation. Therefore, a new strategy is proposed based on a mixed pixel principle to solve the sediment mixing problem in acoustic observation units. Specifically, the following is included:

In S301, gridding of point cloud data: fifty percent of the sample points expanded and screened by a cosine similarity function are taken as training samples, and the remaining fifty percent are used as verification samples for supervised classification. After supervised classification results and the unsupervised classification results of the point clouds are obtained, the large grid is used to process the supervised classification results and the unsupervised classification results.

In S302, calculation of category abundance: the concept of species abundance in ecology is utilized to calculate the abundance of each category in the grids, and the abundance calculation method is similar to a category content/proportion. A schematic diagram of abundance calculation is as shown in FIG. 6.

Figure 6:
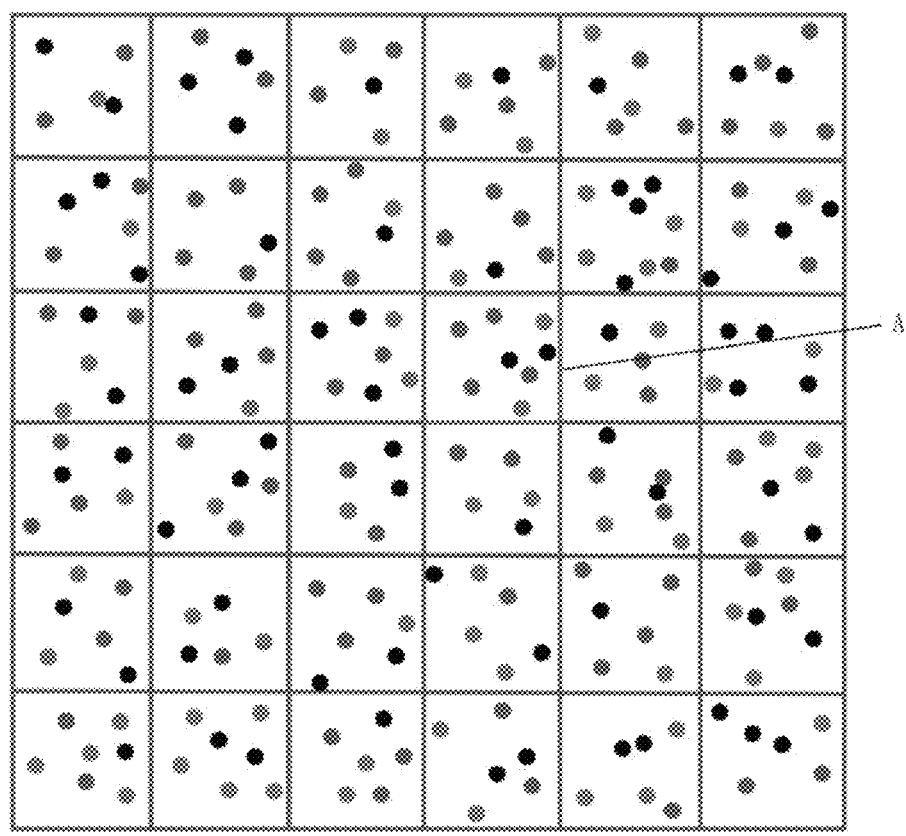
FIG. 6 is a schematic diagram of abundance calculation provided by an embodiment of the present disclosure.
Figure 18:
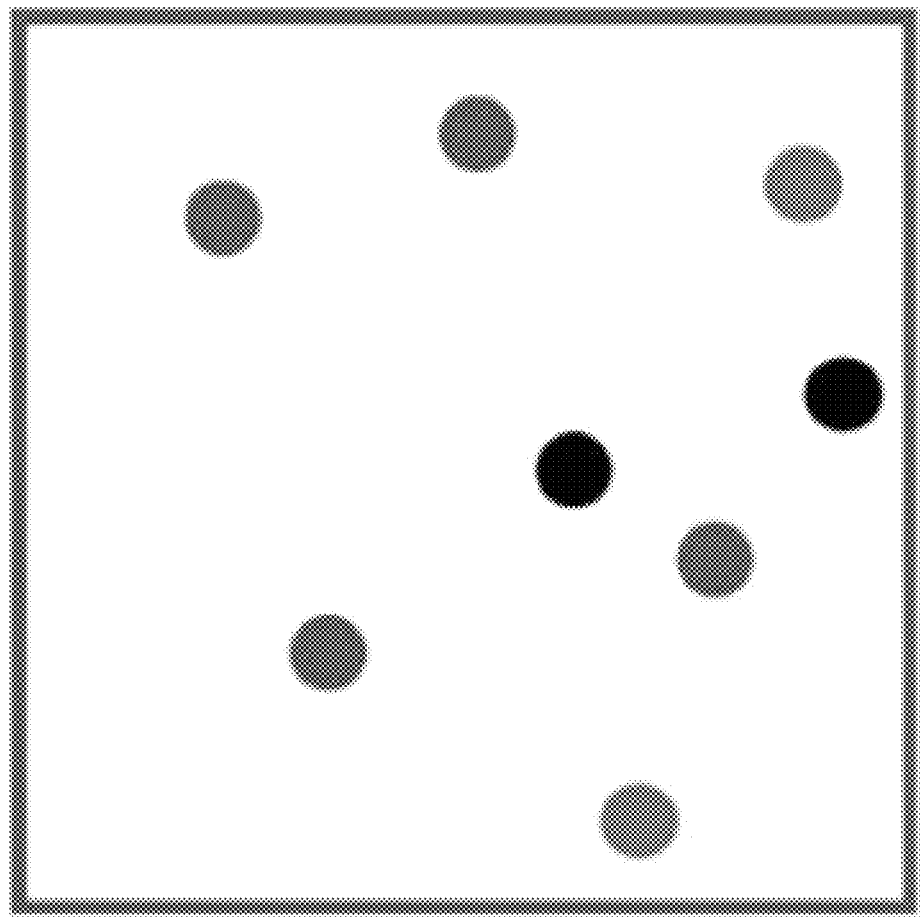
FIG. 18 is an enlarged schematic diagram at A in FIG. 6 provided by an embodiment of the present disclosure.

The beam spots collected by the multibeam are basic units of classification, and are presented on a plane in the form of point clouds when visualization is performed, as shown in FIGS. 6 and 18. The points of different colors in the figure represent different classification categories, and the abundance is calculated under a grid size set by the present disclosure, involving taking each grid as a unit to calculate a proportion (i.e., abundance) of each sediment category in a single grid. The enlarged grid shown in FIG. 18 is taken as an example, and a local abundance map is located in a third row and fourth column of the overall abundance map. There are 8 beam spots in the grid, which are divided according to the proportion of category abundance of 50%, 25% and 25%.

For each category, an abundance image of the category for visualization can be formed in the present disclosure. Single category normalization processing is performed on category abundance values in the grid to form an abundance image of each category abundance.

In S4, decision fusion based on supervised classification and unsupervised classification: discrete point clouds are predicted and classified by using a random forest model, a multi-classification decision fusion mechanism is created, and category decision is performed on a prediction result of the random forest model and an unsupervised classification prediction result.

Figure 5:
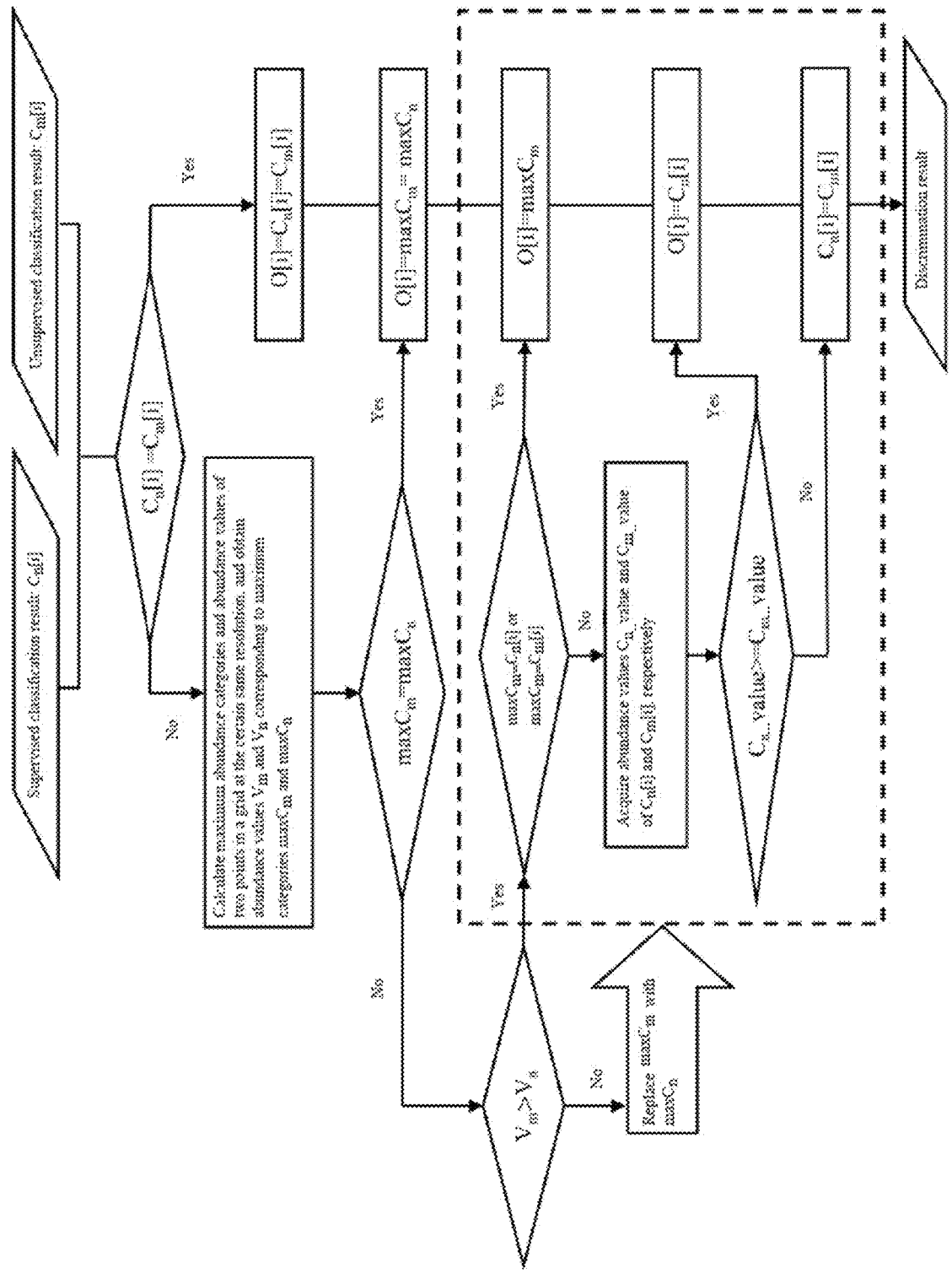
FIG. 5 is a flow chart of decision fusion provided by an embodiment of the present disclosure.

In order to improve the reliability of classification results, a membership decision mechanism based on different classification results is established. The unsupervised classification results are mainly used to discriminate the membership degree of supervision, to optimize the classification results. The flow chart of decision fusion is shown in FIG. 5.

The present disclosure innovatively proposes decision fusion, and the specific process includes the following steps:

In S401, the supervised classification results and the unsupervised classification results are compared one by one, if a supervised classification result and an unsupervised classification result indicate a same category, the same category is taken as a result category, and an expression being as follows:

$$O[i]=C_n[i]=C_m[i]$$

where, $C_n[i]$ is a category of an i-th beam spot in the supervised classification result by random forest, $C_m[i]$ is a category of an i-th beam spot in K-means clustering classification results, and $O[i]$ is the result category through discrimination.

In S402, if the supervised classification result and the unsupervised classification result indicate different categories, categories are calculated in certain large grids where two beam spots corresponding to the supervised classification result and the unsupervised classification result are located, and abundance values corresponding to the categories of the maximum abundances are calculated, $$V_m > V_n$$

$$\max C_n = C_n[i]$$

$$\max C_m = C_m[i]$$

where, $\max C_m$ is a category of a maximum abundance in a K-means abundance grid where the i-th beam spot in K-means clustering classification results is located, $\max C_n$ is a category of a maximum abundance in a forest model abundance grid, where the i-th beam spot in the supervised classification results by the random forest model is located, of the random forest model, $V_m$ is an abundance value corresponding to $\max C_m$, and $V_n$ is an abundance value corresponding to $\max C_n$.

In S403, it is determined whether the categories of the maximum abundances indicate a same category, and if so, it is determined that the same category is the result category.

In S404, if the categories of the maximum abundances indicate different categories, the maximum abundance in the K-means abundance grid and the maximum abundance in the forest model abundance grid are compared to determine whether a category corresponding to a larger abundance of the maximum abundance in the K-means abundance grid and the maximum abundance in the forest model abundance grid exists in the supervised classification results and unsupervised classification results, and if so, the category corresponding to the larger abundance is taken as the result category.

In S405, if the category corresponding to the maximum abundance does not exist in the supervised classification results and the unsupervised classification results, abundance values corresponding to the supervised classification result and the unsupervised classification result are acquired, and a larger one is taken as the result category, $$C_m\_\text{Value} \geq C_n\_\text{Value}$$

where, $C_m\_$Value is an abundance value of $C_m[i]$, and $C_n\_$Value is an abundance value of $C_n[i]$.

In S406, discrimination of steps S401 to S405 is performed on each waveform point to finally discriminate entire data, and outputting a final classification result.

The present disclosure also provides a sediment classification system based on bottom echo information of a deep-sea multibeam water column, implementing the sediment classification method based on bottom echo information of a deep-sea multibeam water column, including:

a multidimensional feature extraction module based on combination of multibeam time series bottom echo with the angle response curve, configured to extract the multidimensional features of the seabed multibeam time series by using the multibeam water column data, and construct the multidimensional features of seabed spots by fusing the angle response curve;

a sample expansion and screening module, configured to perform the double-waveform spectrum comparison of the original sample point waveform with the seabed measured point waveform, match the two groups of corresponding waveforms by using the cosine similarity function, and expand the original sample points;

a decision fusion module based on supervised classification and unsupervised classification, configured to predict and classify the discrete point clouds by using the random forest model, create the multi-classification decision fusion mechanism, and perform category decision on the prediction result and the prediction result of unsupervised classification in a sliding window; and a mixed pixel membership analysis module, configured to construct the classification category abundance map, and complete the seabed habitat inversion of the complex mixed sediment in the deep sea.

In the above-described embodiments, the description of each embodiment has different emphasis, and for parts not described or recorded in detail in a certain embodiment, reference can be made to the related descriptions of other embodiments.

Since the information interaction between the above devices/units, the execution process, and the like are based on the same concept as the method embodiment of the present disclosure, specific functions and technical effects thereof can be found in the method embodiment section, and will not be repeatedly described here.

Those skilled in the art can clearly understand that for the convenience and conciseness of the description, only the division of the above functional units and modules is illustrated by examples, and in practical applications, the above functional allocation can be completed by different functional units and modules according to needs, that is, the internal structure of the device is divided into different functional units or modules to complete all or part of the functions described above. Each functional unit and module in the embodiment can be integrated into one processing unit, each unit can exist physically alone, or two or more units can be integrated into one unit. The integrated units can be realized in the form of hardware or software functional units. In addition, the specific names of each functional unit and module are only for convenience of mutual distinction, and are not intended to limit the scope of protection of the present disclosure. For specific working processes of the units and modules in the above-described system, reference can be made to the corresponding processes in the above-described method embodiments.

An embodiment of the present disclosure also provides a computer apparatus including: at least one processor, a memory, and a computer program stored in the memory and executable on the at least one processor, the processor implementing the steps in any of the above-described method embodiments when executing the computer program.

An embodiment of the present disclosure also provides a computer-readable storage medium, storing a computer program, which, when executed by a processor, implements the steps in any of the above-described method embodiments.

An embodiment of the present disclosure also provides an information data processing terminal, used for providing a user input interface to implement the steps in the above-mentioned method embodiments when being implemented on an electronic device, and the information data processing terminal is not limited to mobile phones, computers and switches.

An embodiment of the present disclosure also provides a server for providing a user input interface to implement the steps in the above-described method embodiments when executed on an electronic device.

An embodiment of the present disclosure provides a computer program product, which, when run on an electronic device, enables the electronic device to execute the steps in any of the above-described method embodiments.

The integrated unit may be stored in a computer-readable storage medium if implemented as a software functional unit and sold or used as a stand-alone product. Based on this understanding, the implementation of all or part of the processes in the methods of the above-described embodiments in the present application can be completed by instructing related hardware through a computer program, and the computer program can be stored in a computer-readable storage medium, and when executed by a processor, the computer program can implement the steps of each of the above-described method embodiments. The computer program includes computer program codes, and the computer program codes may be in a source code form, an object code form, an executable file, some intermediate form, or the like. The computer-readable medium may include at least any entity or device capable of carrying computer program code to the photographing apparatus/terminal apparatus, a recording medium, a computer memory, a read-only memory (ROM), a random-access memory (RAM), an electrical carrier wave signal, a telecommunication signal, and a software distribution medium. For example, U disk, mobile hard disk, magnetic disk or optical disk, etc.

Figure 7:
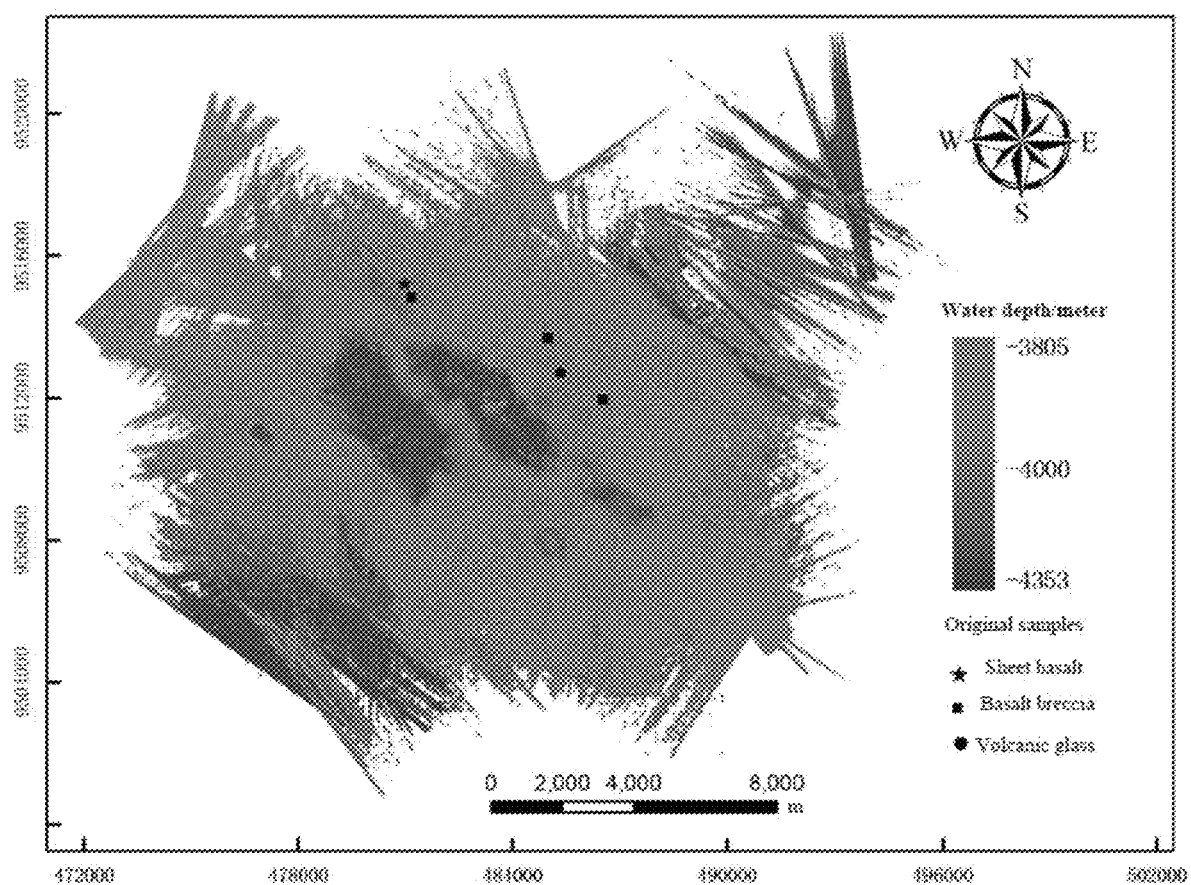
FIG. 7 is an effect diagram of original water depth data provided by an embodiment of the present disclosure.
Figure 8:
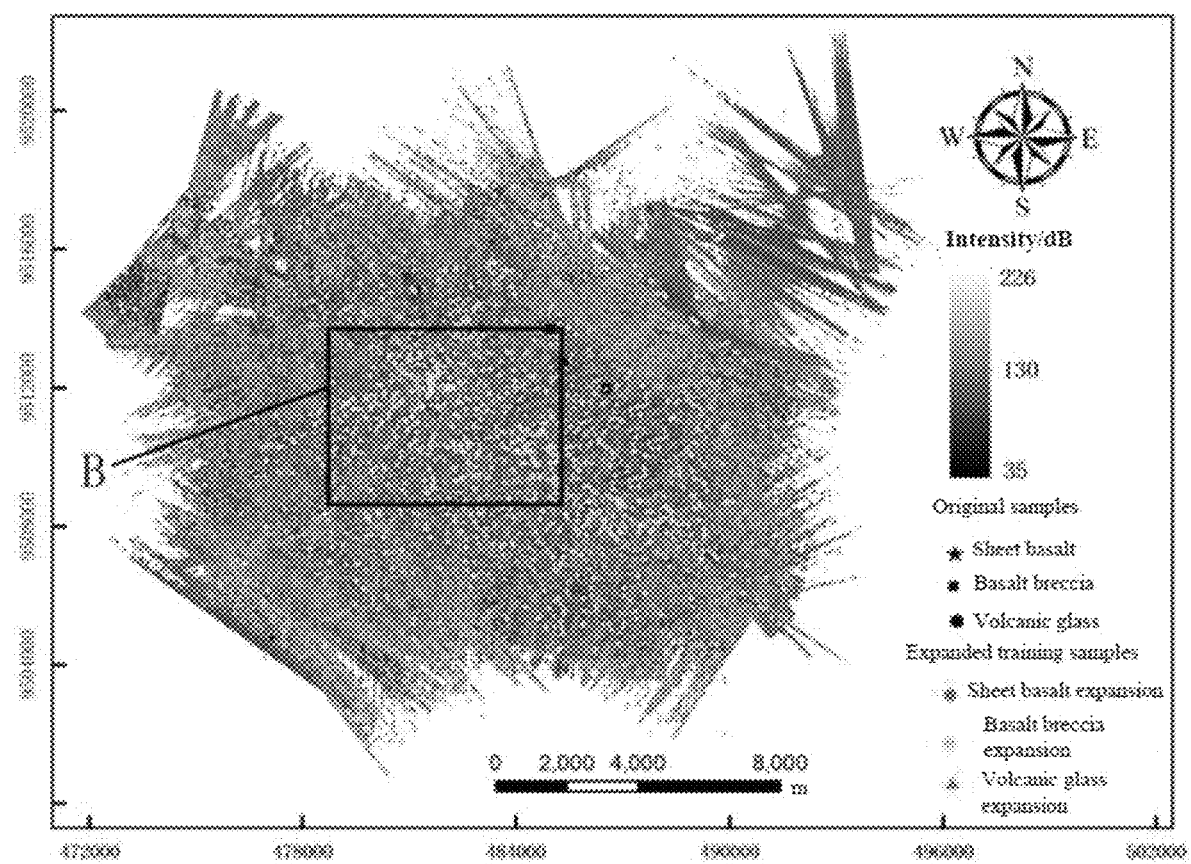
FIG. 8 is an effect diagram of original intensity data provided by an embodiment of the present disclosure.
Figure 19:
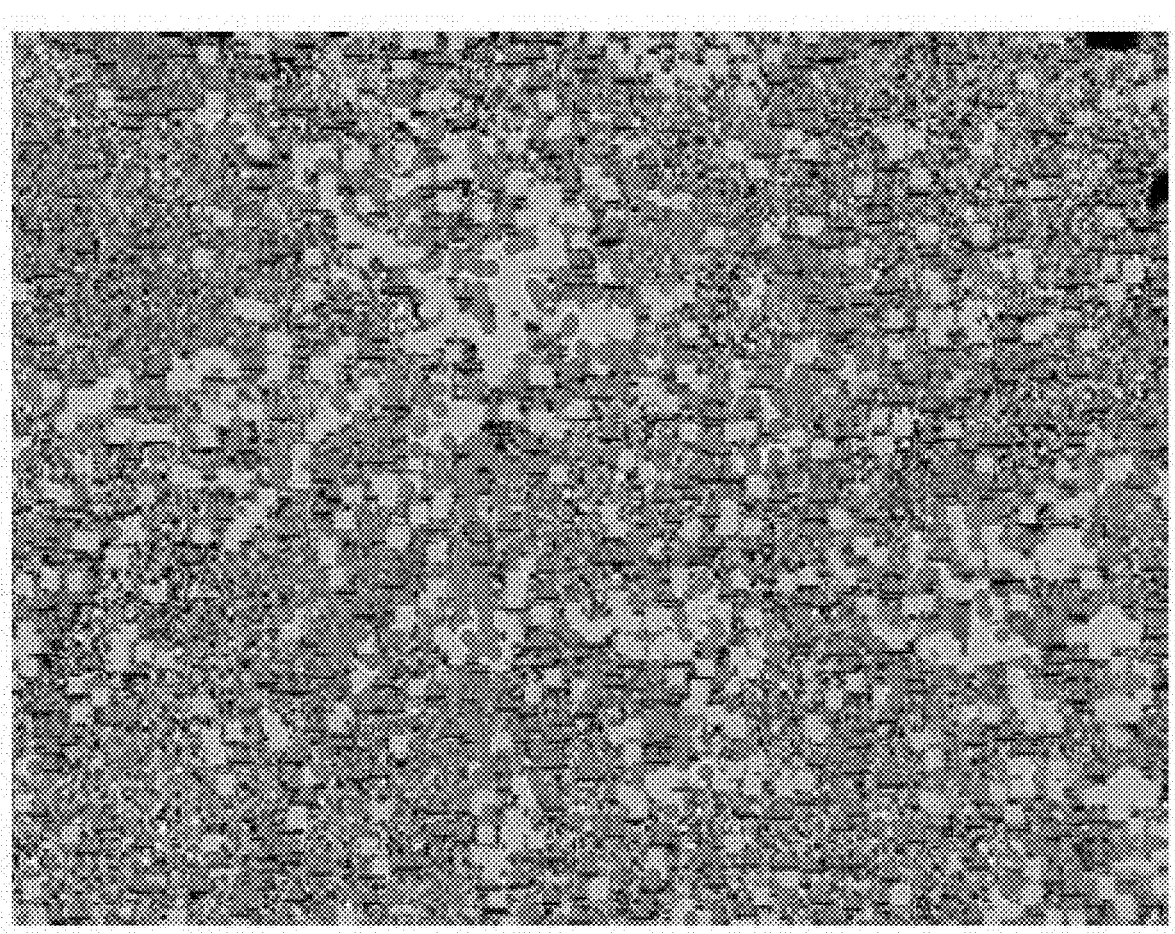
FIG. 19 is an enlarged schematic diagram at B in FIG. 8 provided by an embodiment of the present disclosure.

The present disclosure displays a complete process from multibeam original water column data to final sediment classification and achievement visualization. Taking polar deep-sea data as an example, the average water depth is 4000 m, and the cumulative beam spots are 7.48 million after screening. The original sampling points provided by the data are three categories, including one sheet basalt sample, three basalt breccia samples and one volcanic glass sample. The original water depth data and the original intensity data are shown in FIGS. 7, 8 and 19.

(1) Firstly, the original water column data is preliminarily analyzed by using the Water-Column Analysis Tool of the present disclosure, and after the processing is completed, the bottom echo is intercepted by Matlab and feature extraction is performed.

(2) According to the sampling point data provided by the original materials, the sampling point waveforms are matched with the whole seabed beam spots one by one by cosine similarity function calculation, and the similarity threshold values of 0.91, 0.88 and 0.92 are set as the three types of sediment for sample expansion, eventually expanded to 822, 542 and 677, respectively, with 50% of each being used as the sample set for machine learning training, and the other 50% as a verification set to test a classification accuracy.

Figure 9:
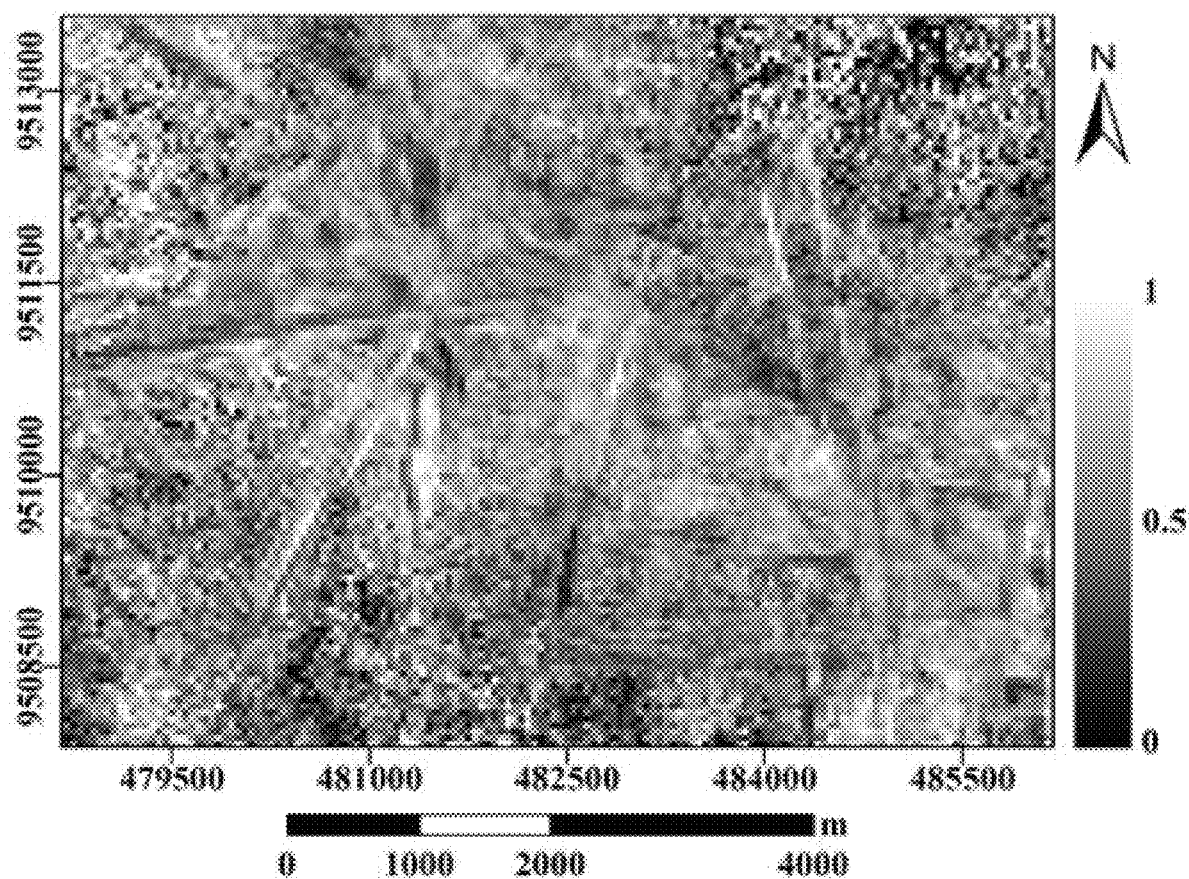
FIG. 9 is an abundance map of sheet basalt in an unsupervised classification K-means classification result provided by an embodiment of the present disclosure.
Figure 10:
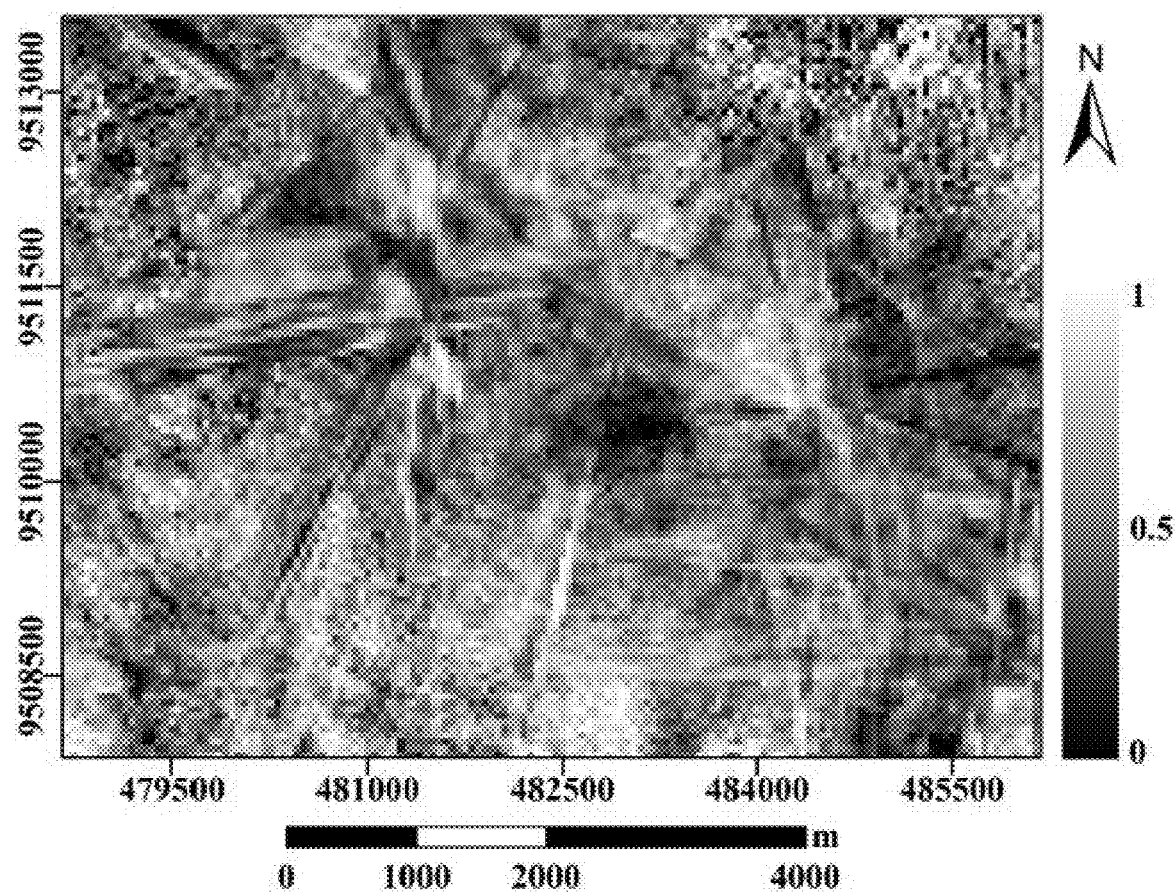
FIG. 10 is an abundance map of basalt breccia in the unsupervised classification K-means classification result provided by an embodiment of the present disclosure.
Figure 11:
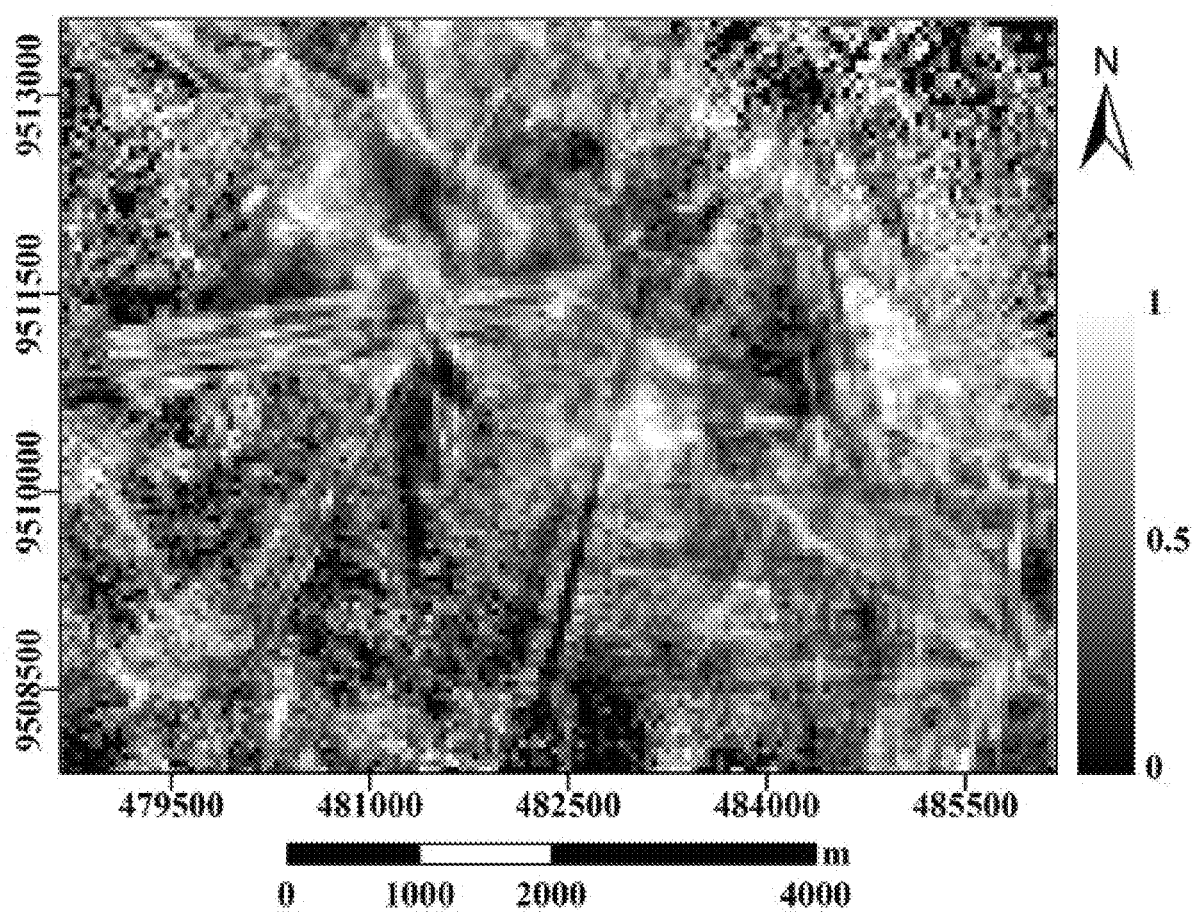
FIG. 11 is an abundance map of volcanic glass in the unsupervised classification K-means classification result provided by an embodiment of the present disclosure.
Figure 12:
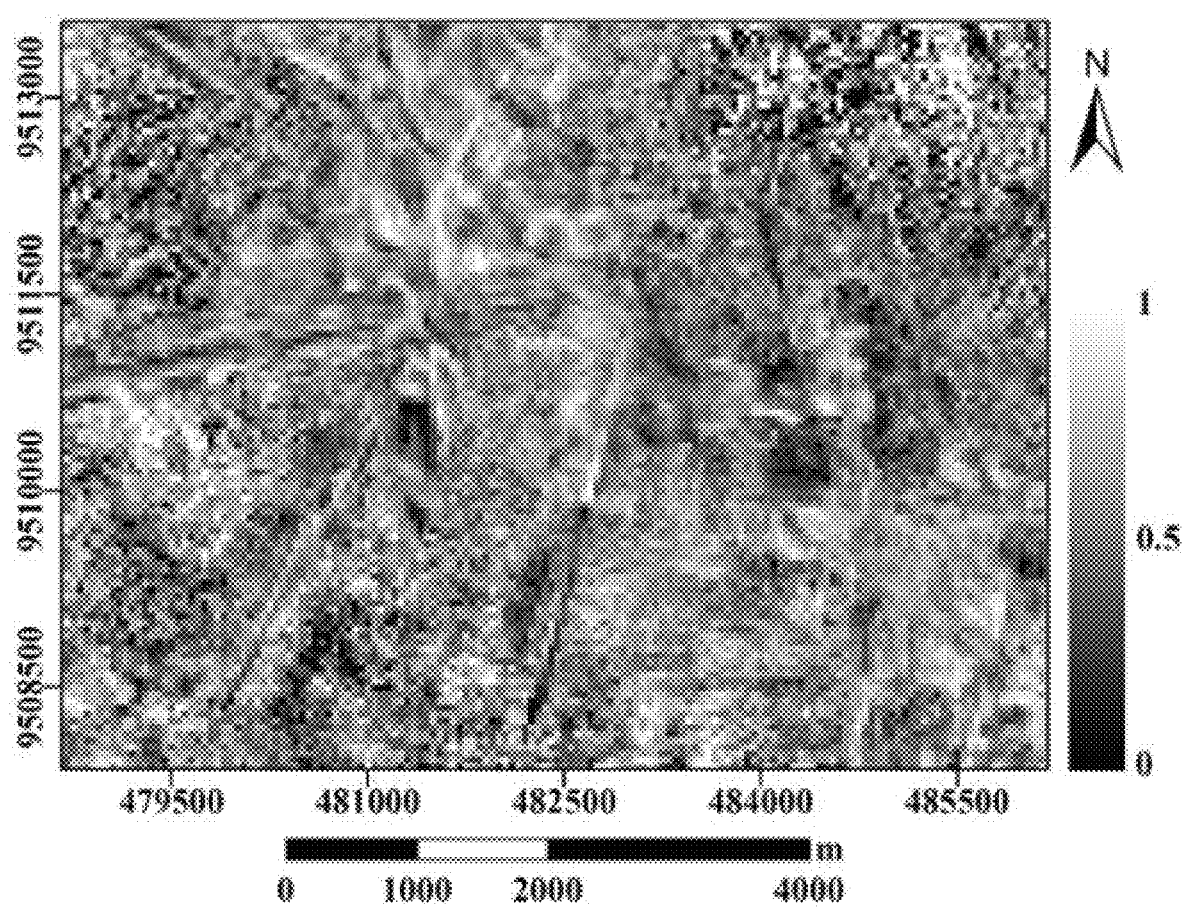
FIG. 12 is an abundance map of sheet basalt in a supervised classification random forest classification result provided by an embodiment of the present disclosure.
Figure 13:
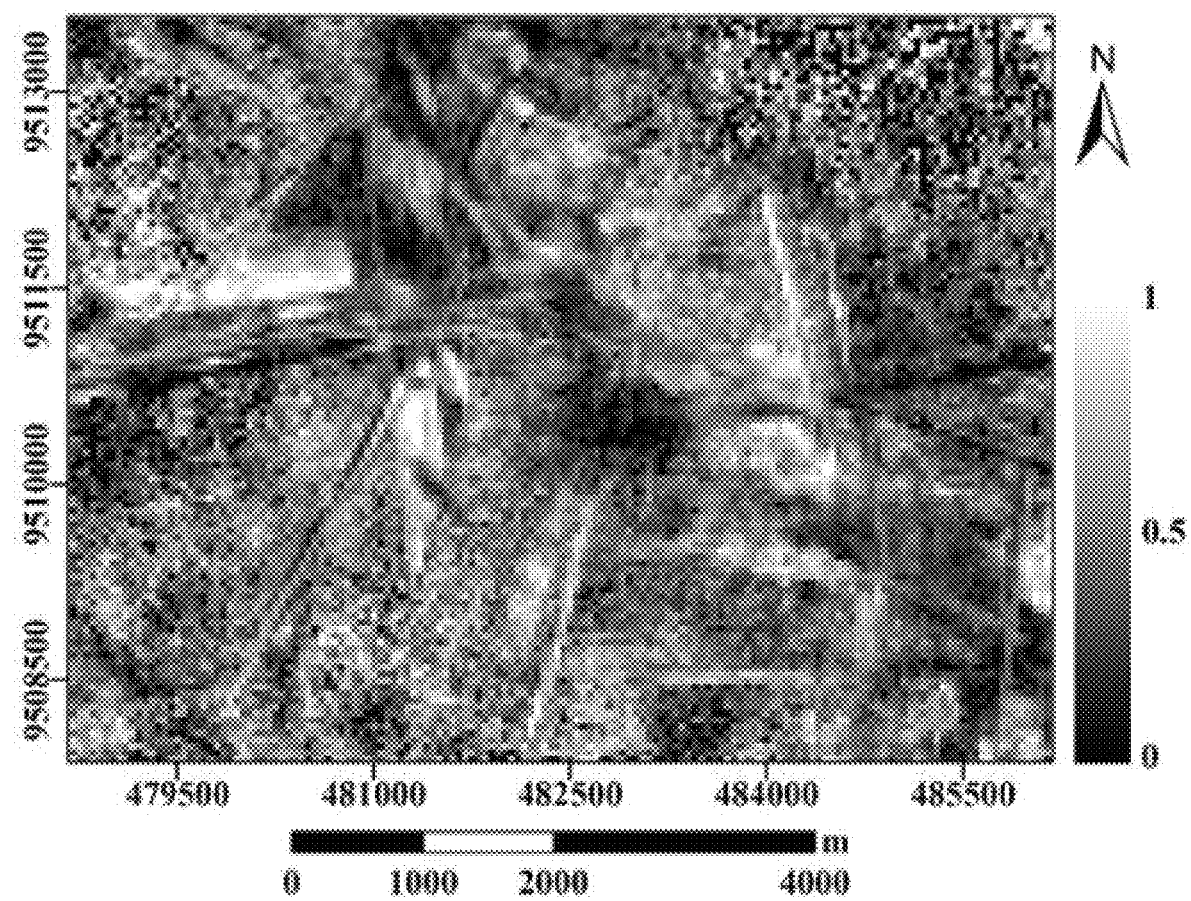
FIG. 13 is an abundance map of basalt breccia in a supervised classification random forest classification result provided by an embodiment of the present disclosure.
Figure 14:
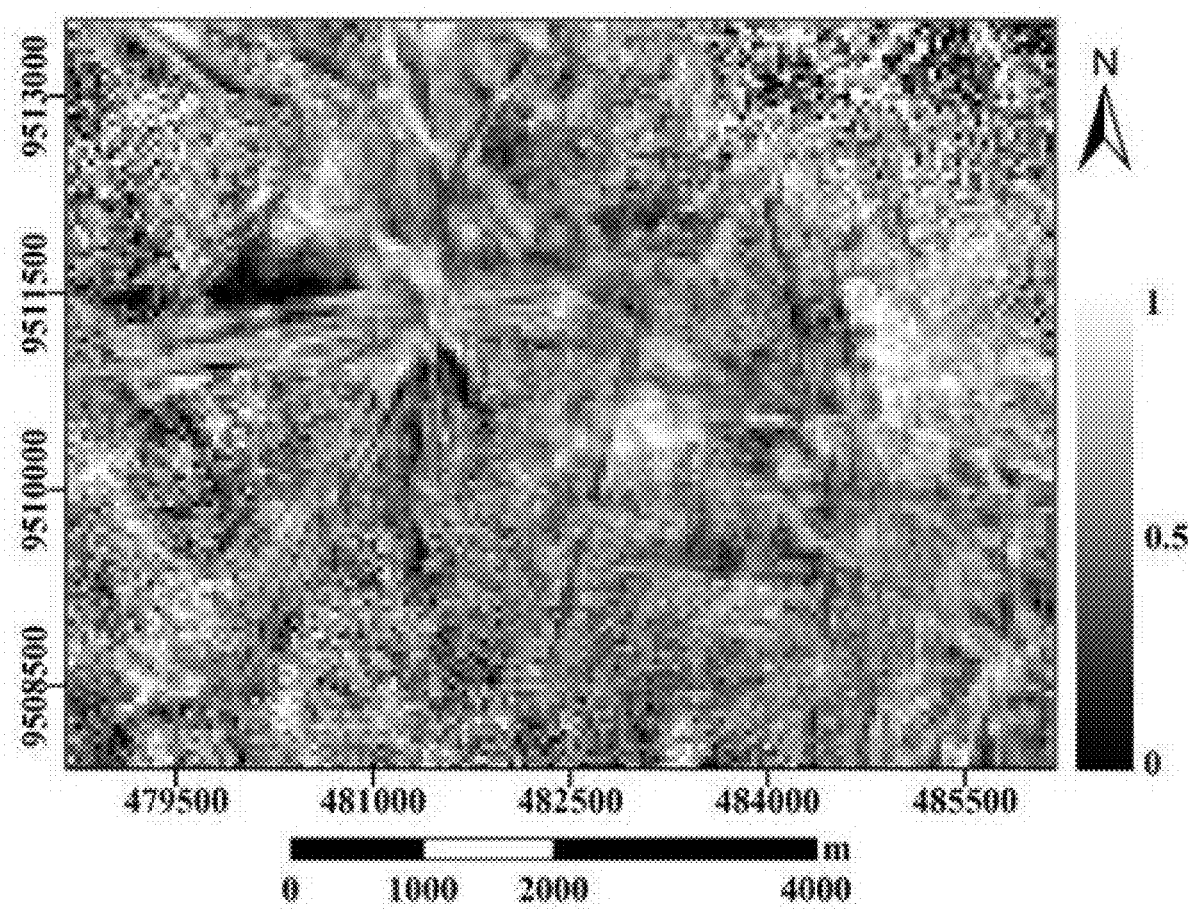
FIG. 14 is an abundance map of volcanic glass in a supervised classification random forest classification result provided by an embodiment of the present disclosure.

(3) The data is classified with an unsupervised classifier (no training samples are needed), and both the supervised classification results and the unsupervised classification results are subjected to abundance gridding processing, with a grid size set to 50 m*50 m. The gridding results are shown in the abundance map of sheet basalt in an unsupervised classification K-means classification result in FIG. 9. FIG. 10 is an abundance map of basalt breccia in the unsupervised classification K-means classification result. FIG. 11 is an abundance map of volcanic glass in the unsupervised classification K-means classification result. FIG. 12 is an abundance map of sheet basalt in a supervised classification random forest classification result. FIG. 13 is an abundance map of basalt breccia in a supervised classification random forest classification result. FIG. 14 is an abundance map of volcanic glass in a supervised classification random forest classification result.

Figure 15:
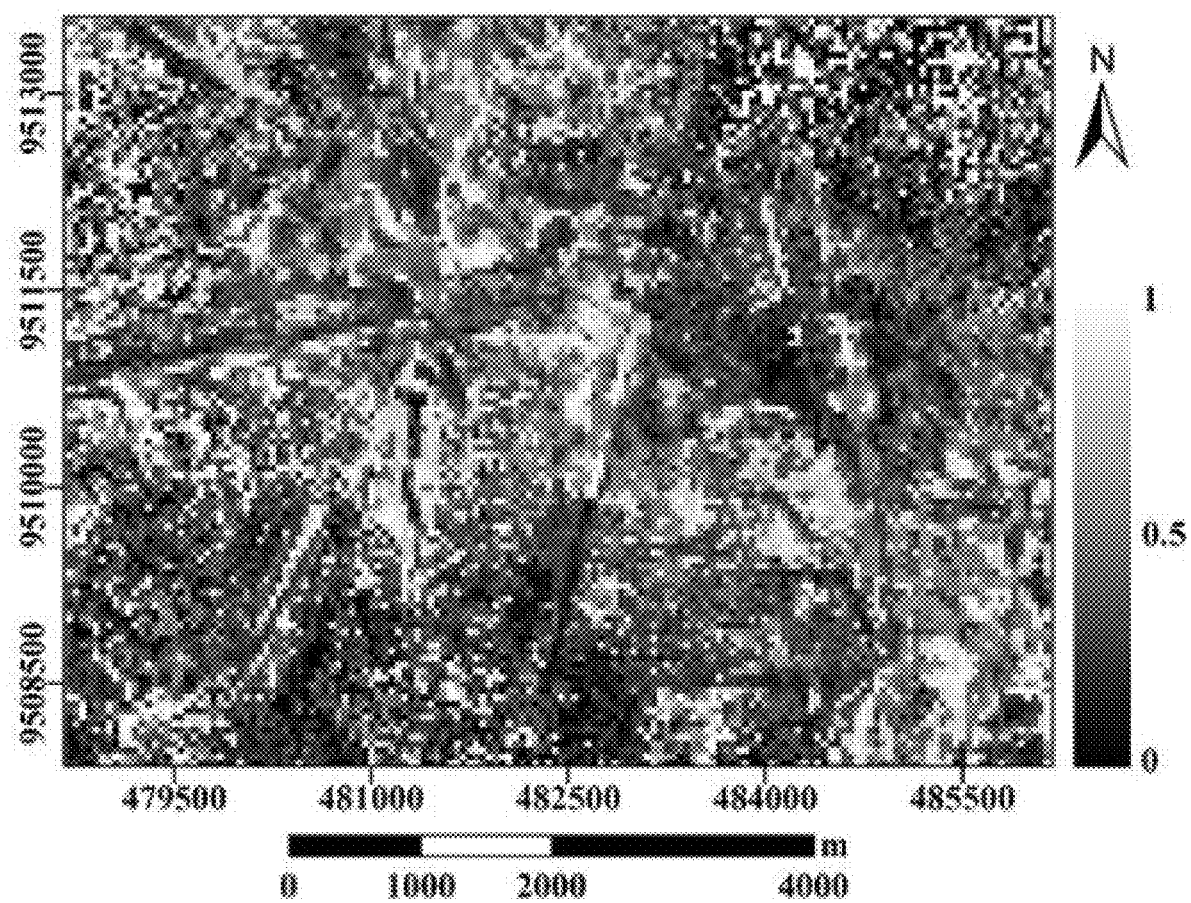
FIG. 15 is an abundance map of sheet basalt in a decision result provided by an embodiment of the present disclosure.
Figure 16:
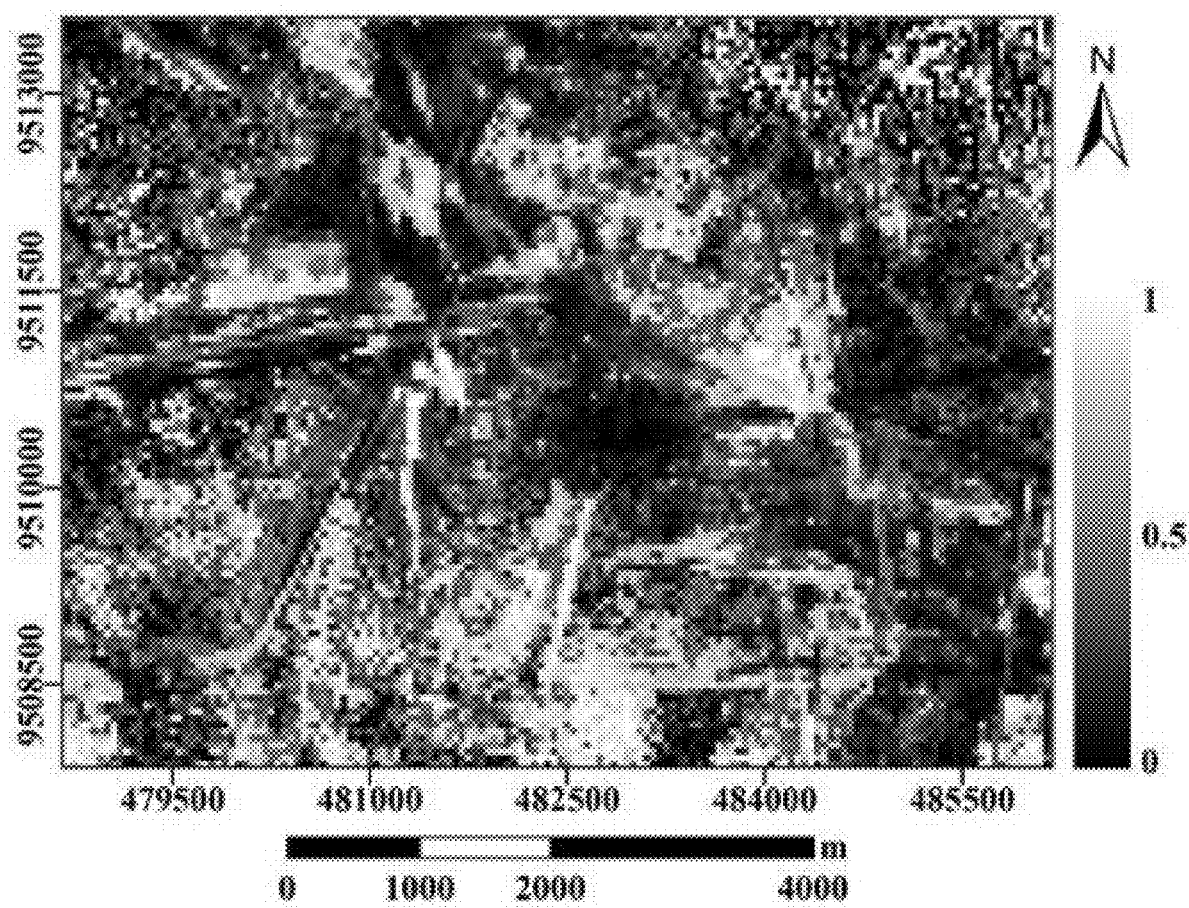
FIG. 16 is an abundance map of basalt breccia in a decision result provided by an embodiment of the present disclosure.
Figure 17:
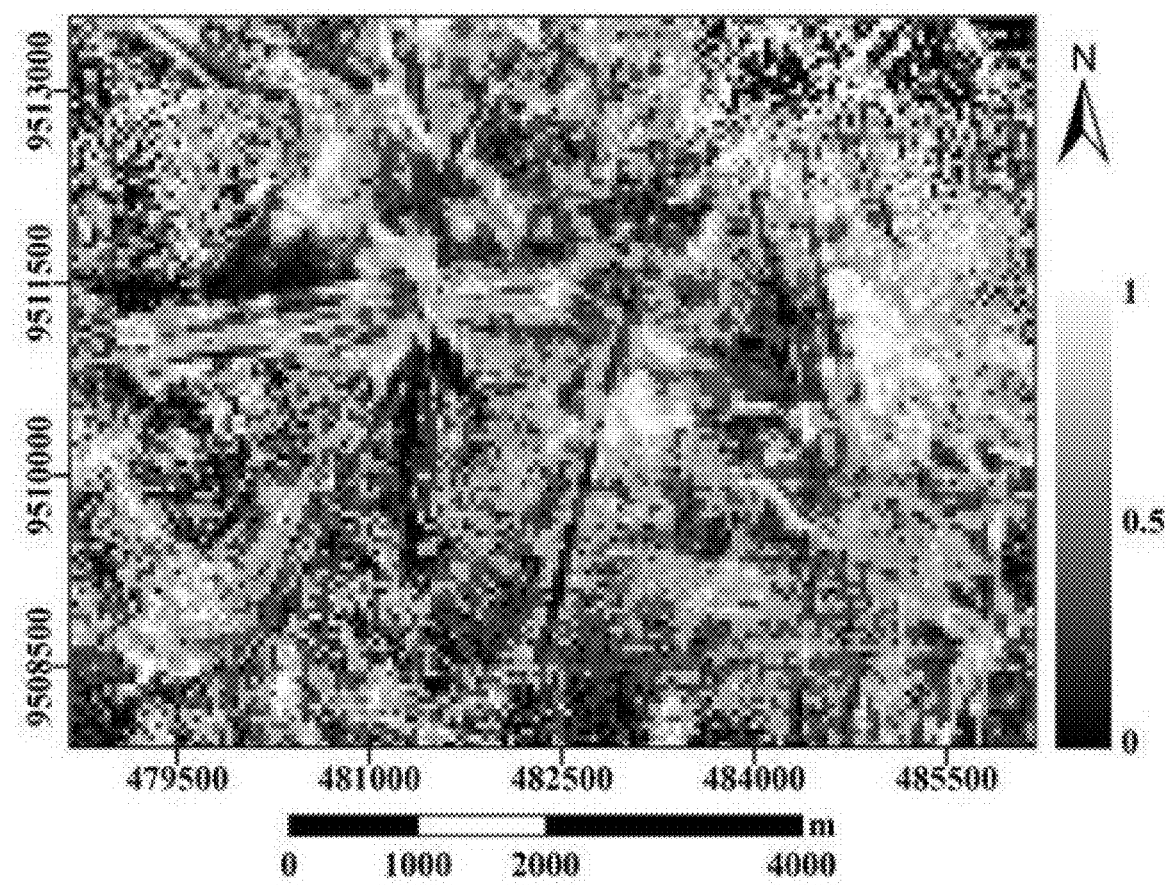
FIG. 17 is an abundance map of volcanic glass in a decision result provided by an embodiment of the present disclosure.

(4) The membership analysis of supervised classification and unsupervised classification results is conducted using the membership decision mechanism under the 50 m*50 m grid, and is finally presented visually in an abundance grid of 80 m*80 m. FIG. 15 is an abundance map of sheet basalt in a decision result. FIG. 16 is an abundance map of basalt breccia in a decision result. FIG. 17 is an abundance map of volcanic glass in a decision result.

The present disclosure creatively utilizes the multibeam echo sequence, intercepts the wavelength band belonging to the seabed part which can characterize the seabed sediment and performs feature extraction. In addition, the extraction and fusion of multidimensional features of multibeam time series are realized by combining the features of angle response curves, which solves the problem of feature extraction of multibeam sampling information in deep-sea environment.

The present disclosure also provides a decision fusion mechanism based on multi-classification results, which combines supervised classification and unsupervised classification, realizes the complementary advantages of the two classification modes and obviously improves the classification effect.

The present disclosure also introduces the concept of abundance, uses the abundance in the large grid to characterize the type and proportion of the sediment, and overcomes the problem of interpreting the seabed mixed sediment at low resolution.

The above is only the preferred implementations of the present disclosure, but the scope of protection of the present disclosure is not limited to this. Any modification, equivalent substitution and improvement made by any person familiar with the technical field within the technical scope disclosed by the present disclosure and within the spirit and principle of the present disclosure are to be included in the scope of protection of the present disclosure.

The invention claimed is:

1. A sediment classification method based on bottom echo information of a deep-sea multibeam water column, the method comprising:
   S1, extraction of multidimensional features: extracting multidimensional features of seabed multibeam time series by using multibeam water column data, and constructing multidimensional features of seabed beam spots by fusing an angle response curve,
   S2, sample expansion and screening: performing double-waveform spectrum comparison of original sample point waveforms with seabed measured point waveforms and matching two groups of corresponding waveforms by using a cosine similarity function so as to expand original sample points, and performing secondary filtration on expanded waveforms by using unsupervised classification results,
   S3, analysis of mixed pixel membership: constructing a classification category abundance map, and completing seabed habitat inversion of complex mixed sediment in a deep sea, and
   S4, decision fusion based on supervised classification and unsupervised classification: predicting and classifying discrete point clouds by using a random forest model, creating a multi-classification decision fusion mechanism, and performing category decision on a prediction result of the random forest model and an unsupervised classification prediction result in an abundance grid, wherein
   the sample expansion and screening in S2 comprises:
      S201, expansion based on the cosine similarity function: expanding the original sample points, which are extremely few in number, by using the cosine similarity function, and
      S202, traversal screening of multivariate classification results: comparing expanded samples one by one through clustering results of unsupervised classification K-means, and eliminating expansion points with low reliability to realize the screening of the expanded samples;
   the analysis of mixed pixel membership in S3 comprises:
      S301, gridding of point cloud data: taking fifty percent of sample points expanded and screened by the cosine similarity function as training samples, and the remaining fifty percent as verification samples for supervised classification, and processing, after obtaining supervised classification results and the unsupervised classification results of the point clouds, the supervised classification results and the unsupervised classification results by using large grids, and
      S302, calculation of category abundance: calculating each category abundance in the grids by utilizing a concept of species abundance in ecology, forming an abundance image of each category for visualization, and performing single category normalization processing on category abundance values in the grids to form an abundance image of each category abundance; and
   the decision fusion based on supervised classification and unsupervised classification in S4 comprises:
      S401, comparing the supervised classification results with the unsupervised classification results one by one, if a supervised classification result and an unsupervised classification result indicate a same category, taking the same category as a result category, and an expression being as follows:

$$O[i]=C_n[i]=C_m[i]$$

where $C_n[i]$ is a category of an i-th beam spot in the supervised classification results by the random forest model, $C_m[i]$ is a category of an i-th beam spot in K-means clustering classification results, and $O[i]$ is the result category through discrimination,
      S402, if the supervised classification result and the unsupervised classification result indicate different categories, calculating categories of maximum abundances in certain large grids where two beam spots corresponding to the supervised classification result and the unsupervised classification result are located and abundance values corresponding to the categories of the maximum abundances, $$V_m > V$$

$$\max C_n = C_n[i]$$

$$\max C_m = C_m[i]$$

where $\max C_m$ is a category of a maximum abundance in a K-means abundance grid where the i-th beam spot in the K-means clustering classification results is located, $\max C_n$ is a category of a maximum abundance of in a forest model abundance grid, where the i-th beam spot in the supervised classification results by the random forest model is located, $V_m$ is an abundance value corresponding to $\max C_m$, and $V_n$ is an abundance value corresponding to $\max C_n$,
      S403, determining whether the categories of the maximum abundances indicate a same category, and if so, determining that the same category is the beam spot the result category,
      S404, if the categories of the maximum abundances indicate different categories, comparing the maximum abundance in the K-means abundance grid and the maximum abundance in the forest model abundance grid to determine whether a category corresponding to a larger abundance of the maximum abundance in the K-means abundance grid and the maximum abundance in the forest model abundance grid exists in the supervised classification results and the unsupervised classification results, and if so, taking the category corresponding to the larger abundance as the result category, S405, if the category corresponding to the larger abundance does not exist in the supervised classification results and the unsupervised classification results, acquiring abundance values corresponding to the supervised classification result and the unsupervised classification result, and taking a larger one as the result category, $$C_{m\_}\text{Value} \geq C_{n\_}\text{Value}$$

where $C_{m\_}$Value is an abundance value of $C_m[i]$, and $C_{n\_}$Value is an abundance value of $C_n[i]$, and S406, performing discrimination of steps S401 to S405 on each waveform point to finally discriminate entire data, and outputting a final classification result.

2. The sediment classification method based on the bottom echo information of the deep-sea multibeam water column according to claim 1, wherein the extraction of multidimensional features in S1 comprises:

S101, extraction of bottom echo: selecting a plurality of waveform sequences downward from a sequence number of each beam reaching a seabed point;

S102, extraction of bottom echo features: extracting an original intensity, maximum value, minimum value, total value, mean value, peak-to-peak value, standard deviation, root-mean-square value, half-wave peak width, peak factor, kurtosis, skewness, and margin factor features from the bottom echo as classification basic data;

S103, extraction of angle response features: using ping as a basic unit for the angle response curve, and extracting mean value, slope, skewness and kurtosis features; and S104, feature fusion: performing parallel merger on the bottom echo features and angle response features to construct a multidimensional feature vector.

3. The sediment classification method based on the bottom echo information of the deep-sea multibeam water column according to claim 2, wherein a calculation formula of the kurtosis in S102 is:

$$\text{Kutosis} = \frac{1}{n-1} \sum_{i=1}^{n} \frac{(x_i - \bar{x})^4}{SD^4} - 3$$

where Kutosis is a kurtosis coefficient, n is a serial number of each sampling point in one ping in multibeam data, xi is an intensity value of each beam, $\bar{x}$ is a mean value of the ping, and SD is a standard deviation of the ping intensity; and a calculation formula of the skewness in S102 is:

$$\text{Skewness} = \frac{1}{n-1} \sum_{i=1}^{n} \frac{(x_i - \bar{x})^3}{SD^3}$$

where Skewness is a skewness coefficient.

4. A sediment classification system based on bottom echo information of a deep-sea multibeam water column, the sediment classification system implementing the sediment classification method based on the bottom echo information of the deep-sea multibeam water column according to claim 3, the sediment classification system comprising:

a multidimensional feature extraction module based on combination of multibeam time series bottom echo with the angle response curve, configured to extract the multidimensional features of the seabed multibeam time series by using the multibeam water column data, and construct the multidimensional features of the seabed spots by fusing the angle response curve;

a sample expansion and screening module, configured to perform the double-waveform spectrum comparison of the original sample point waveform with the seabed measured point waveform, match the two groups of corresponding waveforms by using the cosine similarity function, and expand the original sample points;

a decision fusion module based on supervised classification and unsupervised classification, configured to predict and classify the discrete point clouds by using the random forest model, create the multi-classification decision fusion mechanism, and perform category decision on the prediction result and the prediction result of unsupervised classification in a sliding window; and a mixed pixel membership analysis module, configured to construct the classification category abundance map, and complete the seabed habitat inversion of the complex mixed sediment in the deep sea.

5. A sediment classification system based on bottom echo information of a deep-sea multibeam water column, the sediment classification system implementing the sediment classification method based on the bottom echo information of the deep-sea multibeam water column according to claim 2, the sediment classification system comprising:

a multidimensional feature extraction module based on combination of multibeam time series bottom echo with the angle response curve, configured to extract the multidimensional features of the seabed multibeam time series by using the multibeam water column data, and construct the multidimensional features of the seabed spots by fusing the angle response curve;

a sample expansion and screening module, configured to perform the double-waveform spectrum comparison of the original sample point waveform with the seabed measured point waveform, match the two groups of corresponding waveforms by using the cosine similarity function, and expand the original sample points;

a decision fusion module based on supervised classification and unsupervised classification, configured to predict and classify the discrete point clouds by using the random forest model, create the multi-classification decision fusion mechanism, and perform category decision on the prediction result and the prediction result of unsupervised classification in a sliding window; and a mixed pixel membership analysis module, configured to construct the classification category abundance map, and complete the seabed habitat inversion of the complex mixed sediment in the deep sea.

6. The sediment classification method based on the bottom echo information of the deep-sea multibeam water column according to claim 1, wherein a calculation formula of the cosine similarity function in S201 is as follows:

$$\text{cosine\_similarity} = \frac{\sum_{i=1}^{n} a_i \cdot b_i}{\sqrt{\sum_{i=1}^{n} a_i^2} \cdot \sqrt{\sum_{i=1}^{n} b_i^2}}$$

where $a_i$ and $b_i$ are two vectors whose similarity needs to be solved, a sample point waveform and a seabed point waveform are regarded as two vectors, and a cosine value of an included angle between the two vectors is calculated in a vector space; and the smaller the included angle, the closer the cosine value is to 1, and the higher the similarity.

7. A sediment classification system based on bottom echo information of a deep-sea multibeam water column, the sediment classification system implementing the sediment classification method based on the bottom echo information of the deep-sea multibeam water column according to claim 6, the sediment classification system comprising:
 a multidimensional feature extraction module based on combination of multibeam time series bottom echo with the angle response curve, configured to extract the multidimensional features of the seabed multibeam time series by using the multibeam water column data, and construct the multidimensional features of the seabed spots by fusing the angle response curve;
 a sample expansion and screening module, configured to perform the double-waveform spectrum comparison of the original sample point waveform with the seabed measured point waveform, match the two groups of corresponding waveforms by using the cosine similarity function, and expand the original sample points;
 a decision fusion module based on supervised classification and unsupervised classification, configured to predict and classify the discrete point clouds by using the random forest model, create the multi-classification decision fusion mechanism, and perform category decision on the prediction result and the prediction result of unsupervised classification in a sliding window; and
 a mixed pixel membership analysis module, configured to construct the classification category abundance map, and complete the seabed habitat inversion of the complex mixed sediment in the deep sea.

8. A sediment classification system based on bottom echo information of a deep-sea multibeam water column, the sediment classification system implementing the sediment classification method based on the bottom echo information of the deep-sea multibeam water column according to claim 1, the sediment classification system comprising:
 a multidimensional feature extraction module based on combination of multibeam time series bottom echo with the angle response curve, configured to extract the multidimensional features of the seabed multibeam time series by using the multibeam water column data, and construct the multidimensional features of the seabed spots by fusing the angle response curve;
 a sample expansion and screening module, configured to perform the double-waveform spectrum comparison of the original sample point waveform with the seabed measured point waveform, match the two groups of corresponding waveforms by using the cosine similarity function, and expand the original sample points;
 a decision fusion module based on supervised classification and unsupervised classification, configured to predict and classify the discrete point clouds by using the random forest model, create the multi-classification decision fusion mechanism, and perform category decision on the prediction result and the prediction result of unsupervised classification in a sliding window; and
 a mixed pixel membership analysis module, configured to construct the classification category abundance map, and complete the seabed habitat inversion of the complex mixed sediment in the deep sea.

* * * * *